(12) United States Patent
Yamamoto

(10) Patent No.: US 10,114,725 B2
(45) Date of Patent: Oct. 30, 2018

(54) INFORMATION PROCESSING APPARATUS, METHOD, AND COMPUTER READABLE MEDIUM

(71) Applicant: FUJITSU LIMITED, Kawasaki-shi, Kanagawa (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 15/154,186

(22) Filed: May 13, 2016

(65) Prior Publication Data

US 2016/0357656 A1 Dec. 8, 2016

(30) Foreign Application Priority Data

Jun. 2, 2015 (JP) ................................ 2015-112412

(51) Int. Cl.

| G06F 11/00 | (2006.01) |
|---|---|
| G06F 11/34 | (2006.01) |
| G06F 13/24 | (2006.01) |
| G06F 13/16 | (2006.01) |
| G06F 9/32 | (2018.01) |
| G06F 9/30 | (2018.01) |

(52) U.S. Cl.
CPC ........ G06F 11/3495 (2013.01); G06F 9/3001 (2013.01); G06F 9/321 (2013.01); G06F 11/3423 (2013.01); G06F 13/1673 (2013.01); G06F 13/24 (2013.01)

(58) Field of Classification Search
CPC ............. G06F 11/3495; G06F 11/3423; G06F 11/3466; G06F 11/3471; G06F 11/3636
See application file for complete search history.

(56) References Cited

U.S. PATENT DOCUMENTS 5,564,015 A * 10/1996 Bunnell ................ G06F 1/3215
713/340
7,698,690 B2 * 4/2010 Krauss ................ G06F 11/3612
717/127

(Continued)

FOREIGN PATENT DOCUMENTS

| JP | 2010-191937 | 9/2010 |
|---|---|---|
| JP | 2012-39375 | 2/2012 |

(Continued)

*Primary Examiner* — Philip Guyton
(74) *Attorney, Agent, or Firm* — Staas & Halsey LLP

(57) ABSTRACT

An acquire an integrated value of count values and first information at every specific timing, the integrated value of count values being acquired by counting a number of events generated when a program is executed, and the first information being operation information that includes identification information of the program or information of hardware that is used to execute the program, temporarily store the integrated value and the first information in a first area of a memory, select, when a newly acquired integrated value exceeds a threshold, one of the first information stored in the first area and second information which is operation information corresponding to the newly acquired integrated value, based on the newly acquired integrated value, the integrated value which is stored in the first area, and the threshold, and store the selected information in a second area of the memory.

14 Claims, 24 Drawing Sheets

(56) References Cited

U.S. PATENT DOCUMENTS

2005/0120358 A1* 6/2005 Nikami .................. G06F 13/24
                                                           719/318
2010/0058079 A1   3/2010  Yamamoto et al.
2010/0333071 A1  12/2010  Kuiper et al.

FOREIGN PATENT DOCUMENTS

| JP | 2012-531642 | 12/2012 |
| JP | 2013-238425 | 11/2013 |

* cited by examiner

FIG. 7

| SAMPLE NUMBER | ANALYSIS TARGET DATA CANDIDATE | | | SECTION COUNT VALUE |
|---|---|---|---|---|
| | CPU ID | PID | PC | |
| 1 | 0 | 110 | 0x4010 | 20 |
| 2 | 0 | 110 | 0x4070 | 130 |
| 3 | 0 | 120 | 0x4050 | 10 |
| ... | ... | ... | ... | ... |
| N-1 | 0 | 219 | 0x4110 | 140 |
| N | 0 | 219 | 0x4230 | 1800 |
| N+1 | 0 | 219 | 0x4080 | 70 |
| ... | ... | ... | ... | ... |

COLLECTION DATA TABLE 111

FIG. 8

| SAMPLE NUMBER | ANALYSIS TARGET DATA TABLE 121 |||
|---|---|---|---|
| | ANALYSIS TARGET DATA |||
| | CPU ID | PID | PC |
| x | 0 | 100 | 0x3010 |
| ... | ... | ... | ... |
| N-1 | 0 | 219 | 0x4110 |
| ... | ... | ... | ... |

FIG. 12

| SAMPLE NUMBER | ANALYSIS TARGET DATA CANDIDATE ||| SECTION COUNT VALUE | INTEGRATED VALUE OF COUNT |
|---|---|---|---|---|---|
| | CPU ID | PID | PC | | |
| 1 | 0 | 110 | 0x4010 | 20 | 20 |
| 2 | 0 | 110 | 0x4070 | 130 | 150 |
| 3 | 0 | 120 | 0x4050 | 10 | 160 |
| ... | ... | ... | ... | ... | ... |
| N-1 | 0 | 219 | 0x4110 | 140 | 9860 |
| N | 0 | 219 | 0x4230 | 1800 | 11660 |
| N+1 | 0 | 219 | 0x4080 | 70 | 1730 |
| ... | ... | ... | ... | ... | ... |

COLLECTION DATA TABLE 111

(2) USE (3) 11660−R+70=1730

(1) COMPARE DIFFERENCE WITH CASE WHERE R = 10000

FIG. 19

| | <ADDRESS> | <INSTRUCTION> | |
|---|---|---|---|
| 1 | ... | ... | 141 |
| 2 | 0x4018 | add | |
| 3 | 0x4020 | push | |
| 4 | 0x4028 | Jmp A | |
| 5 | 0x4030 | pop | |
| 6 | ... | ... | |
| 7 | A:0x4070 | | |
| 8 | 0x4070 | mov | |
| 9 | 0x4078 | mov | |
| 10 | ... | ... | |

FIG. 20

| | COLLECTION DATA TABLE | | | | 111a |
|---|---|---|---|---|---|
| SAMPLE NUMBER | ANALYSIS TARGET DATA CANDIDATE | | | SECTION COUNT VALUE | BRANCH TRACE INFORMATION FOR EACH SECTION |
| | CPU ID | PID | PC | | |
| ... | ... | ... | ... | ... | ... |
| N-1 | 0 | 219 | 0x4110 | 140 | ( From_1 0x40c0, To_1 0x40d8 )<br>( From_2 0x40da, To_2 0x40e0 )<br>...<br>( From_k 0x40f8, To_k 0x40fa ) |
| N | 0 | 219 | 0x4230 | 1800 | ... |
| ... | ... | ... | ... | ... | ... |

FIG. 23

| COLLECTION DATA TABLE ||||| 111b |
|---|---|---|---|---|---|
| SAMPLE NUMBER | ANALYSIS TARGET DATA CANDIDATE ||| INTEGRATED VALUE (Si) OF COUNT | COUNT VALUE ($\gamma i$) OF COUNTER CT2 |
| | CPU ID | PID | PC | | |
| N-1 | 0 | 219 | 0x4110 | 140 | 48683 |
| N | 0 | 219 | 0x4230 | 1800 | 50343 |

INFORMATION PROCESSING APPARATUS, METHOD, AND COMPUTER READABLE
MEDIUM

CROSS-REFERENCE TO RELATED
APPLICATION

This application is based upon and claims the benefit of priority of the prior Japanese Patent Application No. 2015-112412, filed on Jun. 2, 2015, the entire contents of which are incorporated herein by reference.

FIELD

The embodiments discussed herein are related to an information processing apparatus, a method, and a computer readable medium.

BACKGROUND

There is a case in which sampling information is acquired in order to perform operation analysis and performance tuning on a program. For example, while causing a computer to execute an arithmetic operation, sampling is performed on the operation information (an instruction address, a Process Identification (PID), and the like of an execution target) of the computer which is executing the operation. If so, a program, a function, and the like, which are executed at sampling timing, are specified based on the operation information on which the sampling is performed, thereby being useful to grasp the operation situation of the program and to specify a performance improvement portion.

For example, a method of sampling electric power consumption has been proposed. In the proposal, when a counter overflows in an integrated electric power counter, which measures electric power consumption at each arbitrary fixed time and integrates the measured values, interruption for sampling is sent to a central processing unit (CPU). The CPU, which receives the interruption, transfers execution control on a predetermined sampling program, thereby enabling sampling and profiling based on the power consumption.

Meanwhile, there is a proposal which attempts to reduce low electric power consumption by, when the transmission power of a wireless transmission apparatus is measured, causing a transmission power measurement apparatus to be in an active mode in each sampling section and to be in a sleeping mode, in which electric power consumption is lower than that of the active mode, other than in each sampling section. In addition, there is a proposal in which, if content for changing the state of an air conditioner that influences the amount of electric power consumption is input in a case where the amount of electric power consumption of the air conditioner is measured at every predetermined timing, the input content is recorded to be associated with an input timing.

Japanese Laid-open Patent Publication No. 2010-191937, Japanese Laid-open Patent Publication No. 2012-39375, and Japanese Laid-open Patent Publication No. 2013-238425 are disclosed as examples of related art.

SUMMARY

According to an aspect of the invention, an information processing apparatus includes: a processor configured to: acquire an integrated value of count values and first information at every specific timing, the integrated value of count values being acquired by counting a number of events generated when a program is executed, and the first information being operation information that includes identification information of the program or information of hardware that is used to execute the program, temporarily store the integrated value and the first information in a first area of a memory, select, when a newly acquired integrated value exceeds a threshold, one of the first information stored in the first area and second information which is operation information corresponding to the newly acquired integrated value, based on the newly acquired integrated value, the integrated value which is stored in the first area, and the threshold, and store the selected information in a second area of the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a collection data table according to the second embodiment;

FIG. 8 is a diagram illustrating an example of an analysis target data table according to the second embodiment;

FIG. 12 is a diagram illustrating an example of the analysis target data extraction according to the second embodiment;

FIG. 19 is a diagram illustrating an example of instruction string information according to the third embodiment;

FIG. 20 is a diagram illustrating an example of a collection data table according to the third embodiment;

FIG. 23 is a diagram illustrating an example of a collection data table according to a fifth embodiment.

DESCRIPTION OF EMBODIMENTS

As described above, a case may be considered in which sampling is performed by generating interruption when a counter overflows. However, there may be a counter having no interruption function with hardware as above. In this case, a method for sampling operation information is an issue, which uses a count value obtained by the counter having no interruption function.

For example, it may be considered that integrated value of count of the counter from an immediately previous sampling timing is acquired at every fixed time interval, and the operation information is sampled at timing in which the integrated value of count exceeds a predetermined value. However, in the method, it is difficult to measure the exact timing in which the integrated value of count exceeds the predetermined value (sampling timing is delayed compared to the timing), and thus the accuracy of determining the sampling timing is low. There is a possibility that the operation information changes according to the elapse of time, and thus there is a problem in that inappropriate operation information is sampled.

According to an aspect, an object of the embodiment is to provide an information processing apparatus, an execution information recording program, and an execution information recording method which are capable of acquiring more appropriate operation information.

Hereinafter, embodiments will be described with reference to the accompanying drawings.

First Embodiment

Figure 1:
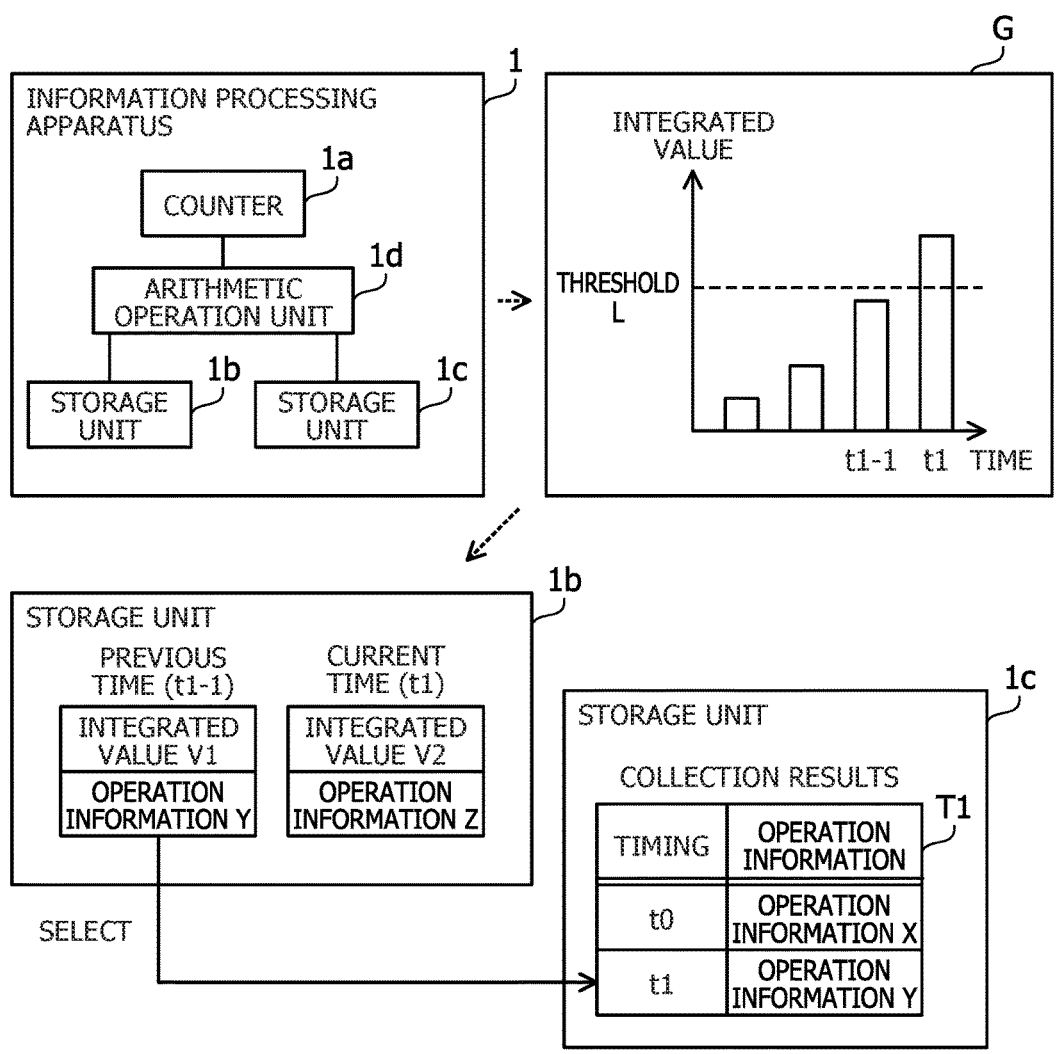
FIG. 1 is a diagram illustrating an information processing apparatus according to a first embodiment.

FIG. 1 is a diagram illustrating an information processing apparatus according to a first embodiment. An information processing apparatus 1 executes an analysis target program, and samples the operation information of the information processing apparatus 1 at timing according to a count value of a base event. The base event is an event which is a base for determining the timing. The operation information may include, for example, the information (for example, a process ID of an executed process, an instruction address, an identification information of a processor which executes the process, and the like) on a program, which is executed on the information processing apparatus 1, and information on hardware.

The information processing apparatus 1 includes a counter 1a, storage units 1b and 1c, and an arithmetic operation unit 1d. The counter 1a counts the number of base events (the number of cache misses and the amount of electric power consumption). For example, in a case of a cache miss is counted, 1 is added to a count value. In addition, for example, in a case where the amount of electric power consumption is used, 1 is added to a count value if the amount of electric power corresponding to unit quantity (for example, 1 joule) is consumed. The counter 1a does not include an interruption function by hardware. Therefore, for example, in a case where sampling timing is determined based on the number counted by the counter 1a, it is difficult to use hardware interruption based on the counter overflow of the counter 1a.

The storage units 1b and 1c may be a volatile storage device, such as a random access memory (RAM), or a non-volatile storage device such as a hard disk drive (HDD) or a flash memory. For example, the storage units 1b and 1c may be a RAM or the storage unit 1b may be a RAM and the storage unit is may be an HDD. The storage unit is may be a storage device which is externally attached to the information processing apparatus 1. The arithmetic operation unit 1d may include a central processing unit (CPU), a digital signal processor (DSP), an application specific integrated circuit (ASIC), a field programmable gate array (FPGA), and the like. The arithmetic operation unit 1d may be a processor which executes a program. Here, the "processor" may include a set (multi-processor) of a plurality of processors. In addition, the arithmetic operation unit 1d may include the counter 1a.

The storage unit 1b temporarily stores the results, which include the integrated value of count values of the number of base events acquired by the counter 1a and operation information of the program and the hardware, acquired by the arithmetic operation unit 1d.

The storage unit is stores the results of collection of the operation information which is used for analyzing the behavior of the information processing apparatus 1 while the analysis target program is being executed. The data is executed by the arithmetic operation unit 1d.

The arithmetic operation unit 1d acquires the operation information in a case where the integrated value of the number of base events counted by the counter 1a exceeds a predetermined value, and stores the operation information in the storage unit 1c. However, as described above, it is difficult for the counter 1a to use interruption based on the counter overflow. Here, the arithmetic operation unit 1d collects operation information as follows.

The arithmetic operation unit 1d acquires the integrated value of the number counted by the counter 1a and the operation information at every fixed time interval, and stores the integrated value and the operation information in the storage unit 1b. The fixed time intervals may be measured by a counter other than the counter 1a (for example, a timer counter which has an interruption function based on counter overflow and which is not illustrated in FIG. 1). For example, the arithmetic operation unit 1d acquires the integrated value of the number counted by the counter 1a and the operation information according to interruption which is received from another counter at fixed time intervals.

If the integrated value of the number counted by the counter 1a exceeds a predetermined value, the arithmetic operation unit 1d selects current operation information in the information processing apparatus 1 and operation information which is temporarily stored in the storage unit 1b based on the integrated value and the predetermined value, and stores the current operation information and the temporarily stored operation information in the storage unit 1c.

Specifically, a threshold L is set up in the storage unit 1b in advance as a predetermined value of the integrated value of the number counted by the counter 1a. The threshold L may be considered as a value for determining a sampling rate of the sampling performed by the counter 1a. Furthermore, the arithmetic operation unit 1d acquires an integrated value V1 and operation information Y at timing t1-1, and stores the acquired integrated value V1 and the operation information Y in the storage unit 1b. The integrated value V1 is a value which is smaller than the threshold L.

Subsequently, the arithmetic operation unit 1d acquires the integrated value V1 and operation information Z at timing t1 subsequent to timing t1-1. An integrated value V2 is a value which is greater than the threshold L. That is, the arithmetic operation unit 1d detects a fact that the integrated value V2 exceeds the threshold L at timing t1. A graph G illustrates the relationship between the integrated values V1 and V2 and the threshold L at timing t1-1 and t. Furthermore, the arithmetic operation unit 1d acquires, for example, a difference D1=L−V1 between the immediately previous integrated value V1, which is temporarily stored in the storage unit 1b, and the threshold L. The arithmetic operation unit 1d acquires a difference D2=V2−L between the newly acquired integrated value V2 and the threshold L. The arithmetic operation unit 1d selects any one of pieces of operation information Y and Z as operation information to be collected as a result of collection by comparing the difference D1 with the difference D2. The arithmetic operation unit 1d selects the operation information which corresponds to a small difference.

More specifically, in the above example, the difference D1 is smaller than the difference D2. In this case, the arithmetic operation unit 1d selects the operation information Y. For example, the arithmetic operation unit 1d associates the operation information Y with information at timing t1 and records the operation information Y in a collected result table T1 which is stored in the storage unit 1c. In the collected result table T1, operation information X, which is acquired immediately before sampling timing t0 by the counter 1a. Meanwhile, although the arithmetic operation unit 1d associates the operation information Y with information at timing t1 and stores the operation information Y in the storage unit 1c, the arithmetic operation unit 1d may store the operation information Y in the storage unit 1c without associating the operation information Y with the information at timing t1.

Thereafter, the arithmetic operation unit 1d subtracts the threshold L from the integrated value V2, and acquires the integrated value of the numbers counted by the counter 1a. If so, the arithmetic operation unit 1d can acquire the integrated value from a value V2-L at timing t1, and repeatedly determines sampling timing of the counter 1a by comparing the integrated value with the threshold L.

The arithmetic operation unit 1d analyzes the pieces of operation information which are collected in the storage unit 1b in this manner. For example, it is possible to specify a relevant section in a program (for example, a function, a subroutine, and the like) based on the ID of a process, which is executed when an event occurrence section (for example, excess of a threshold of cache miss numbers and the amount of electric power consumption) is generated, and the instruction address. The arithmetic operation unit 1d statistically analyzes a result of collection, specifies a program section having high frequency when an event occurs, and outputs the program section (such analysis is referred to as profiling). In this manner, the information processing apparatus 1 can support a developer to specify a program section in which there is a room for performance of improvement.

However, as described above, it may be considered that the integrated value V1 and the operation information Y at timing t1-1 is not temporarily stored, in addition, the integrated values V1 and V2 are not compared with the threshold L, and the operation information Z at timing t1 is recorded in the collected result table T1 without change. However, in this case, there is a possibility that timing t1 is delayed rather than timing (original timing in which the integrated value is L+1) in which the integrated value of the number counted by the counter 1a exceeds the threshold L. As the amount of delay at timing t1 is large, there is a high possibility that the operation information Z is different from operation information at original timing. In this manner, if analysis is performed based on the accumulated operation information, there is a problem in that the reliability of the analysis result is low.

Here, as in the information processing apparatus 1, the integrated value V1 and the operation information Y at timing t1-1 are temporarily stored, and any one of the pieces of operation information Y and Z is selected to be used by comparing the integrated values V1 and V2 with the threshold L when the integrated value V2 exceeds the threshold L at timing t1. The reason for this is that it is possible to determine that the divergence from the original timing in which the threshold L is exactly exceeded as large as the difference between the threshold L and the integrated value is large, and it is possible to determine that the divergence from the original timing is as small as the difference between the threshold L and the integrated value is small. In this manner, even in a case where the trigger for sampling is measured using the counter 1a which does not include a hardware interruption section, it is possible to select more appropriate operation information. In addition, in this manner, it is possible to improve the reliability of the analysis result by performing analysis based on the accumulated operation information.

Second Embodiment

Figure 2:
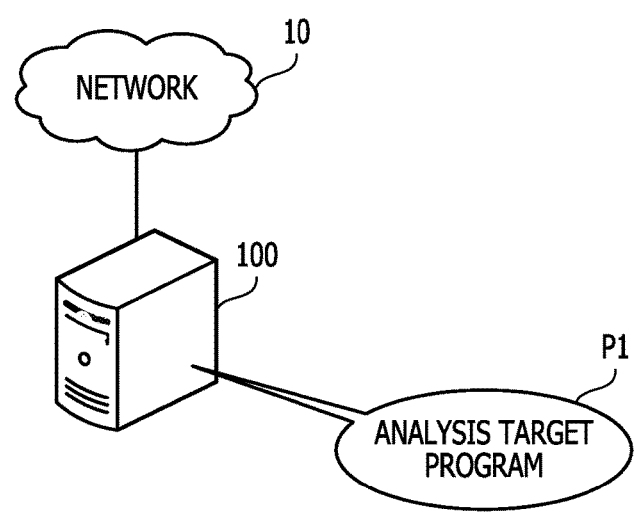
FIG. 2 is a diagram illustrating an analysis apparatus according to a second embodiment.

FIG. 2 is a diagram illustrating an analysis apparatus according to a second embodiment. An analysis apparatus 100 executes an analysis target program P1, and acquires operation information of the analysis apparatus 100 during the execution. The analysis apparatus 100 may be a server computer or a client computer. The analysis apparatus 100 is coupled to a network 10, and can communicate with another computer through the network 10.

Figure 3:
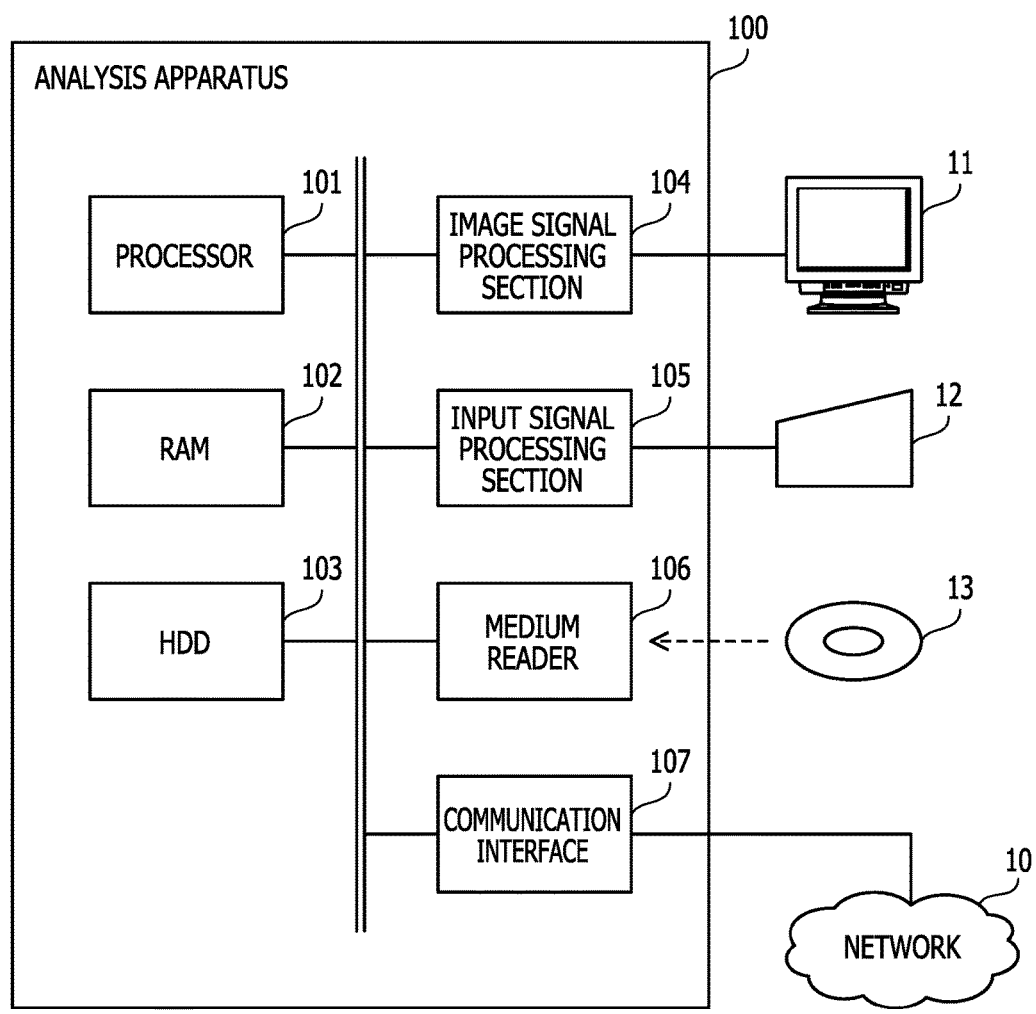
FIG. 3 is a diagram illustrating a hardware example of the analysis apparatus according to the second embodiment.

FIG. 3 is a diagram illustrating a hardware example of the analysis apparatus according to the second embodiment. The analysis apparatus 100 includes a processor 101, a RAM 102, an HDD 103, an image signal processing section 104, an input signal processing section 105, a medium reader 106 and a communication interface 107. Each of the sections is coupled to the bus of the analysis apparatus 100.

The processor 101 controls an information process performed by the analysis apparatus 100. The processor 101 may be a multi-processor. The processor 101 is, for example, a CPU, a DSP, an ASIC, an FPGA, or the like. The processor 101 may be a combination of two or more components of the CPU, the DSP, the ASIC, the FPGA, and the like.

The RAM 102 is a main storage apparatus of the analysis apparatus 100. The RAM 102 temporarily stores at least a part of a program of an operating system (OS) and an application program which are executed by the processor 101. The application program includes, for example, the analysis target program P1 and a program which realizes a function of the analysis apparatus 100 which will be described later. In addition, the RAM 102 stores various data which are used for process performed by processor 101.

The HDD 103 is an auxiliary storage apparatus of the analysis apparatus 100. The HDD 103 magnetically writes and reads data to and from an embedded magnetic disc. The HDD 103 stores the program of the OS, the application program (for example, the analysis target program), and various data. The analysis apparatus 100 may include another type of apparatus, such as a flash memory and a solid state drive (SSD), or may include a plurality of auxiliary storage apparatuses.

The image signal processing section 104 outputs an image to a display 11, which is coupled to the analysis apparatus 100, according to an instruction from the processor 101. It is possible to use a cathode ray tube (CRT) display, a liquid crystal display or the like as the display 11.

The input signal processing section 105 acquires an input signal from an input device 12 which is coupled to the analysis apparatus 100, and outputs the input signal to the processor 101. It is possible to use, for example, a pointing device such as a mouse or a touch panel, a keyboard, and the like as the input device 12.

The medium reader 106 is an apparatus which reads a program and data which are recorded in a recording medium 13. It is possible to use, for example, a magnetic disc such as a flexible disk (FD) and an HDD, an optical disk such as a compact disc (CD) and a digital versatile disc (DVD), and a magneto-optical disk (MO) as the recording medium 13. In addition, it is possible to use, for example, non-volatile semiconductor memory, such as a flash memory card, as the recording medium 13. The medium reader 106 stores the program and data, which are read from the recording medium 13, in the RAM 102 or the HDD 103 according to, for example, an instruction from the processor 101.

The communication interface 107 communicates with another apparatus through the network 10. The communication interface 107 may be a wired communication interface or a wireless communication interface.

Figure 4:
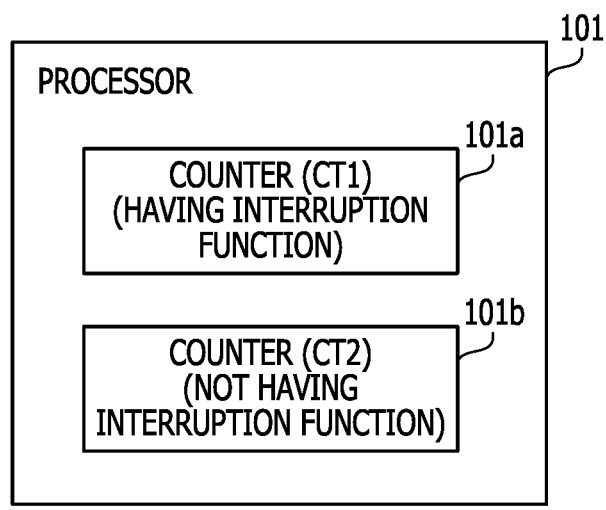
FIG. 4 is a diagram illustrating an example of a processor according to the second embodiment.

FIG. 4 is a diagram illustrating an example of a processor according to the second embodiment. The processor 101 includes counters 101a and 101b. For example, the counters 101a and 101b may be referred to as a Performance Event Monitoring Counter (PMC).

The counter 101a is a counter which can be used as a timer. The counter 101a has a hardware interruption function. Specifically, the counter 101a can generate interruption if count overflows. With the function, the counter 101a generates interruption at every fixed time interval. If so, it is possible to record values of a program counter and a predetermined register using a driver for exceptional process which is prepared in advance, and it is possible to collect information when interruption is generated. Meanwhile, a counter, which is a counter that counts the number of generations of other types of events and which has the hardware interruption function, may be used as the counter 101a. In addition, a Time Stamp Counter (TSC), which counts the number of clock cycles of the processor 101, may be used as the counter 101a.

The counter 101b counts the number of base event occurrence times. The base event includes, for example, instruction execution, cache miss occurrence, electric power consumption, the number of execution cycles (the elapse of time), and the like. In the example according to the second embodiment, electric power consumption is assumed as the base event. In this case, it is possible to refer to the counter 101b as an electric power control monitoring counter. One count of the counter 101b corresponds to, for example, the amount of unit electric power consumption. The amount of electric power consumption is the amount corresponding to energy which is expressed in unit of joule, watt, or the like. For example, one count of the counter 101b corresponds to a fact that an event in which the amount of electric power corresponding to 1 joule is consumed occurs one time. However, the counter 101b may be a counter which counts the number of another-type base event occurrence times, such as instruction execution and cache miss occurrence.

The counter 101b does not have the hardware interruption function. This is different from the counter 101a. That is, in the counter 101b, it is difficult to generate interruption based on the overflow of a counter register unlike the counter 101a. Therefore, in the example according to the second embodiment, the counter 101a is used in auxiliary manner such that the counter 101b determines the sampling timing (performs event-based sampling). Specifically, the processor 101 refers to the count value of the counter 101b at timing in which interruption is generated by the counter 101a, and compares the count value of the counter 101b with a predetermined threshold, thereby determining sampling timing.

However, in this case, it is difficult to measure timing (original timing) in which the count value of the counter 101b exactly exceeds the threshold. The reason for this is that, since timing, in which the count value of the counter 101b is compared with the threshold, is determined by the counter 101a, timing in which the comparison is performed is delayed rather than original timing. Here, the analysis apparatus 100 provides a function which enables more appropriate information to be sampled in the event-based sampling performed by the counter 101b. Meanwhile, in the description below, it is assumed that the identifier of the counter 101a is "CT1" and the identifier of the counter 101b is "CT2" for convenience. In the drawing, there is a case where counters are distinguished from each other by the identifier.

Figure 5:
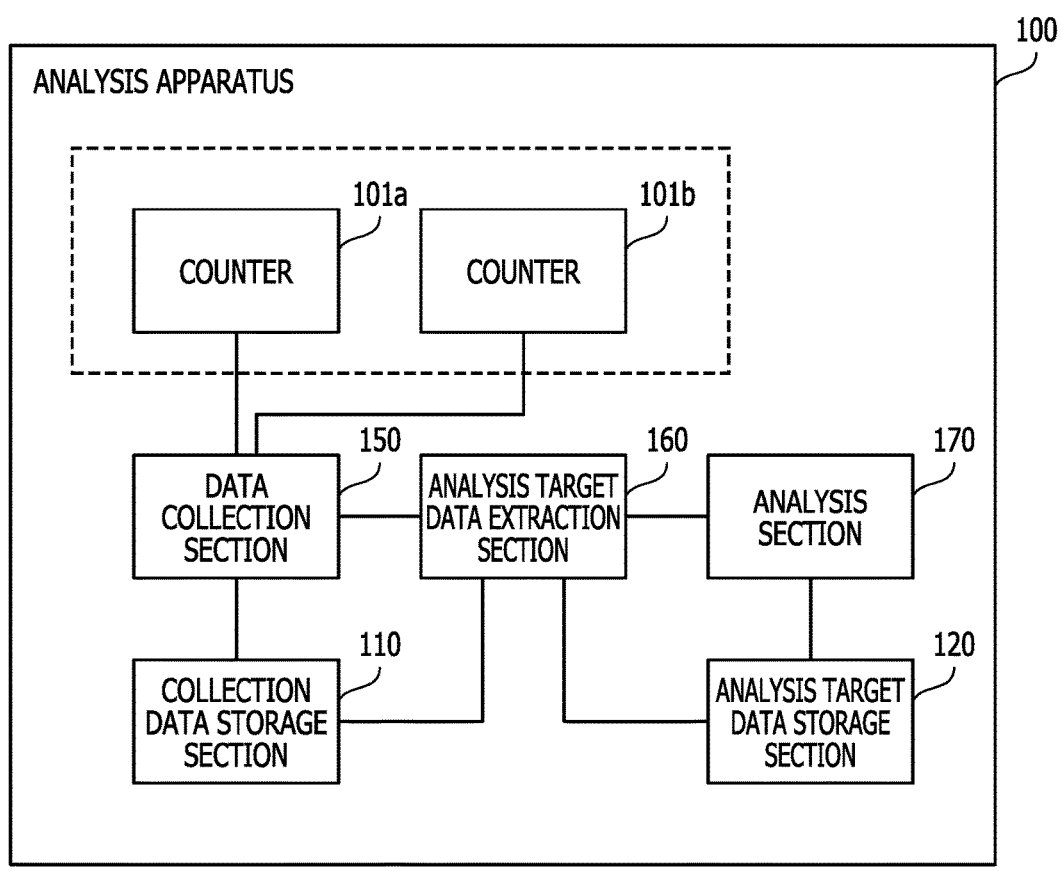
FIG. 5 is a diagram illustrating an example of a function of the analysis apparatus according to the second embodiment.

FIG. 5 is a diagram illustrating an example of a function of the analysis apparatus according to the second embodiment. The analysis apparatus 100 includes a collection data storage section 110, an analysis target data storage section 120, a data collection section 150, an analysis target data extraction section 160, and an analysis section 170. The collection data storage section 110 and the analysis target data storage section 120 are realized as storage areas which are secured in the RAM 102 or the HDD 103. The data collection section 150, the analysis target data extraction section 160, and the analysis section 170 are realized in such a way that the processor 101 executes the program which is stored in the RAM 102.

The collection data storage section 110 stores collecting data. The collection data is the operation information of the analysis apparatus 100, which is acquired at every fixed time interval while the analysis target program P1 is being executed. The fixed time intervals are measured by the counter 101a.

The analysis target data storage section 120 stores the analysis target. The analysis target data is data which is extracted from the collecting data. Analysis target data sampling timing is determined based on the count value of the counter 101b.

The data collection section 150 acquires an ID of a process which is being executed, an address value of the program counter, and the like at every fixed time interval timing (timing of interruption performed by the counter 101a) during a period in which the analysis target program P1 is executed. In addition, the data collection section 150 acquires the count value of the counter 101b at the same timing. The data collection section 150 stores the acquired process ID, the address value, and the count value of the counter 101b (difference from immediately before data collection time) in the collection data storage section 110. The information, which is stored in the collection data storage section 110 by the data collection section 150, corresponds to the collection data. The data collection section 150 may have a function which is called by a driver for an exceptional process based on interruption or a function which is incorporated with the driver for the exceptional process.

The analysis target data extraction section 160 extracts the collection data, which is acquired at timing according to the count value of the counter 101*b*, from the collection data which is stored in the collection data storage section 110. It is assumed that the collection data which is extracted in this manner is referred to as analysis target data. The analysis target data extraction section 160 can extract the analysis target data from the collection data storage section 110. The analysis target data extraction section 160 specifies data to be extracted as the analysis target data among the collection data, which is stored in the collection data storage section 110, based on the count value of the counter 101*b*. The analysis target data extraction section 160 stores the extracted analysis target data in the analysis target data storage section 120.

For example, the analysis target data extraction section 160 extracts the analysis target data at each timing, in which a fixed amount of electric power corresponding to the threshold is consumed, based on the count value of the counter 101*b*. However, as described above, the counter 101*b* does not have the hardware interruption function, and thus timing, in which the fixed amount of electric power is consumed, is not preciously measured unlike a case where it is possible to use the hardware interruption function. Strictly speaking, the amount of electric power consumption between timings, in which the analysis target data is extracted, is approximately fixed. The analysis target data, which is stored in the analysis target data storage section 120 in this manner, indicates the process ID and the instruction address which are executed at each timing in which the fixed amount of electric power is consumed (as described above, more strictly speaking, at each timing in which the approximately fixed amount of electric power is consumed).

The analysis section 170 analyzes (profiles) the analysis target data which is stored in the analysis target data storage section 120, and outputs the result of the analysis. The analysis section 170 specifies a program section, such as the function or the subroutine of the analysis target program P1 which is executed at every timing, based on the analysis target data. The analysis section 170 statistically analyzes the analysis target data, specifies a program section having high frequency when a base event (an event in which a fixed amount of electric power is consumed) occurs, and outputs the program section to the display 11 or the like. For example, the analysis section 170 displays an image which indicates the result of output on the display 11. For example, a developer can specify candidates of the program section in which there is a room for improvement from a viewpoint of electric power consumption by inspecting the image which is displayed on the display 11.

Figure 6:
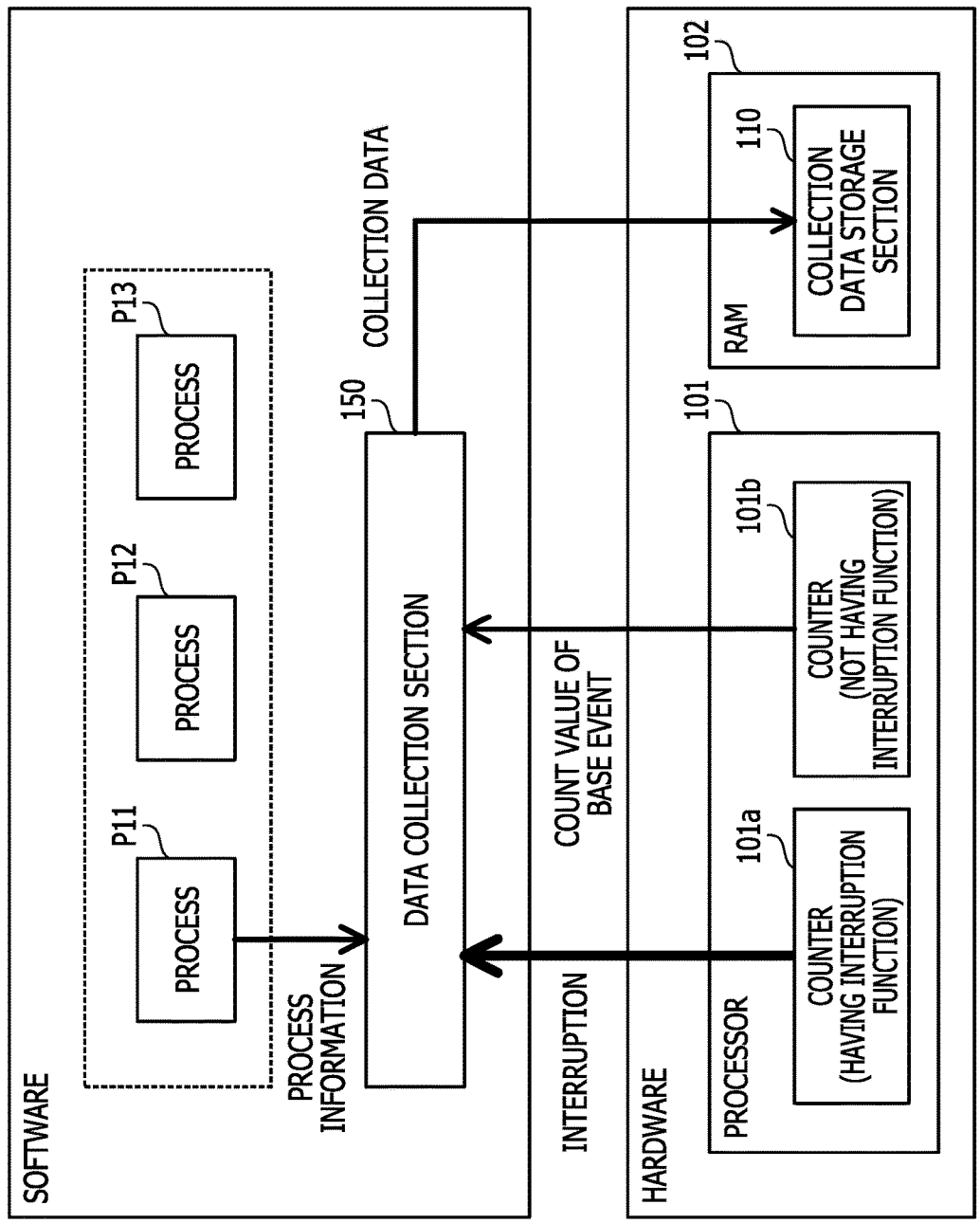
FIG. 6 is a diagram illustrating an example of data collection performed by a data collection section according to the second embodiment.

FIG. 6 is a diagram illustrating an example of data collection performed by the data collection section according to the second embodiment. For example, at a certain point of time of a period in which the analysis target program P1 is being executed, the OS of the analysis apparatus 100 finishes scheduling of execution of processes P11, P12, and P13, and is executing the process P11. At this time, the data collection section 150 receives interruption from the counter 101*a* at every fixed time interval. If the data collection section 150 receives interruption from the counter 101*a*, the data collection section 150 acquires process information, which includes a process ID or the like, from the process P11 which is being currently executed. In addition, the data collection section 150 acquires a value of the program counter (not illustrated in the drawing). Furthermore, the data collection section 150 acquires the count value of the base event (corresponding to the amount of electric power consumption) from the counter 101*b*. The data collection section 150 stores the acquired information (collecting data) in the collection data storage section 110 (in the example of FIG. 6, the storage area which is secured within the RAM 102).

FIG. 7 is a diagram illustrating an example of a collection data table according to the second embodiment. A collection data table 111 is stored in the collection data storage section 110. The collection data table 111 includes items of a sample number, an analysis target data candidate, and a section count value.

In the item of the sample number, the sample number is registered. The sample number is a number which identifies a record, and is a number which is given by the data collection section 150 in order which is collected by the data collection section 150. In the item of the analysis target data candidate, candidates of the analysis target data are registered. Furthermore, in the item of the analysis target data candidate, items including a CPU ID, a process ID (PID), and a program counter (PC) are provided. In the item of the CPU ID, the identifiers of CPUs (CPU IDs) are registered. In a case where the analysis apparatus 100 executes programs using a plurality of CPUs, it is possible to distinguish between subjects of the execution of the respective processes by the CPU IDs (in the example, it is assumed that the CPU IDs are fixed). In the item of the PID, process IDs are registered. In the item of the PC, address values which are stored in the program counter are registered. In the item of the section count value, the section count value of the counter 101*b* is registered. The section count value is a count value corresponding to the difference between the count value of the counter 101*b* at a point of time, in which the data collection section 150 performs immediately before data collection, and the count value of the counter 101*b* at a point of time in which current data collection is performed. Meanwhile, at a point of time of initial data collection after the data collection section 150 starts the data collection, the difference from a count value "0" (initial value of the counter 101*b*) is the section count value.

For example, in the collection data table 111, the following records are registered. First is a record in which the sample number is "N−1" (N is an integer which is equal to or larger than 2), the CPU ID of the analysis target data candidate is "0", the PID is "219", the PC is "0x4110", and the section count value is "140". This is the collection data acquired when (N−1)-th interruption is received from the counter 101*a*, and indicates that the CPU ID is "0", the process ID is "219", the value of the program counter is "0x4110", and the section count value of the counter 101*b* is "140".

Second is a record in which the sample number is "N", the CPU ID of the analysis target data candidate is "0", the PID is "219", the PC is "0x4230", and the section count value is "1800". This is the collection data acquired when N-th interruption is received from the counter 101*a*, and indicates that the CPU ID is "0", the process ID is "219", the address value of the program counter is "0x4230", and the section count value of the counter 101*b* is "1800".

FIG. 8 is a diagram illustrating an example of an analysis target data table according to the second embodiment. The analysis target data table 121 is stored in the analysis target data storage section 120. The analysis target data table 121 includes items of the sample number and the analysis target data.

In the item of the sample number, the sample number is registered. In the item of the analysis target data, the analysis target data is registered. Furthermore, in the item of the analysis target data, items of the CPU ID, the PID, and the PC are provided. Pieces of information, which are registered in the items of the CPU ID, the PID, and the PC, are the same pieces of information as in the respective items of the same names illustrated in FIG. 7. Meanwhile, in the analysis target data table 121, the item of the sample number may be omitted. Otherwise, in a case where the content of the analysis target data is acquired from the collection data table 111 by using the sample number as a key, the item of the analysis target data may be omitted from the analysis target data table 121.

For example, in the analysis target data table 121, a record, in which the sample number is "N−1", the CPU ID of the analysis target data is "0", the PID is "219", and the PC is "0x4110", is registered. This indicates that information, which corresponds to a sample number "N−1" and in which the CPU ID is "0", the process ID is "219", and the value of the program counter is "4110", is extracted as the analysis target data from the collection data table 111.

Figure 9A:
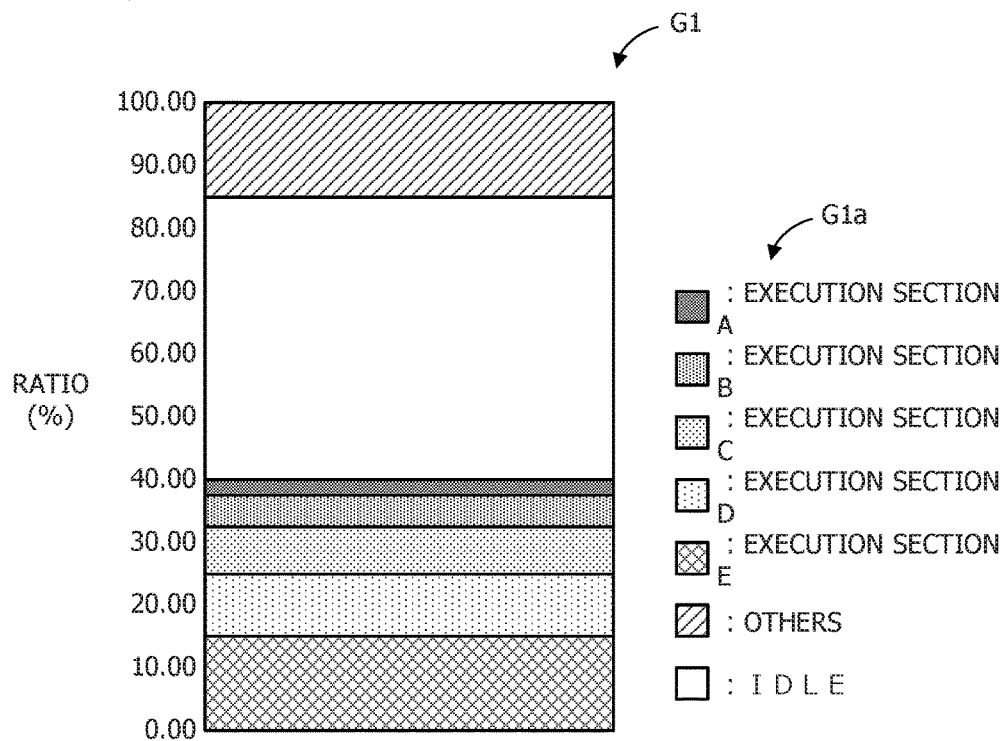
FIGS. 9A and 9B are diagrams illustrating examples of outputs of the analysis results according to the second embodiment.
Figure 9B:
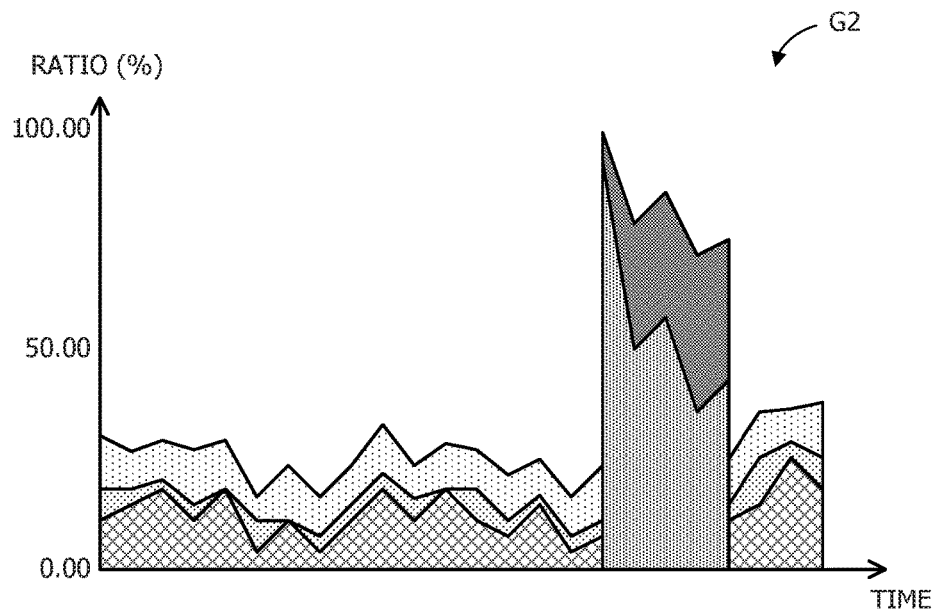

FIGS. 9A and 9B are diagrams illustrating examples of outputs of the analysis results according to the second embodiment. FIG. 9A illustrates a graph G1. The graph G1 is an example of output of results acquired by statistical analyzing the analysis target data, which is recorded in the analysis target data table 121, by the analysis section 170 for entire analysis target time. For example, the analysis section 170 specifies a program section (execution section), such as a function which is being executed in a case where the amount of electric power consumption exceeds the threshold, from the pieces of information of the process ID and the program counter for each record of the analysis target data table 121. For example, the analysis section 170 accumulates the specified execution section, and acquires a ratio of a frequency in which each execution section is observed to the total number of observations (corresponding to the number of records in the analysis target data table 121) in the entire analysis target time. The analysis section 170 displays the result as the graph G1 on the display 11. FIG. 9A also illustrates an explanatory note G1a. In the explanatory note G1a, "execution sections A, B, C, D, and E" correspond to the names of functions and subroutines which are included in the analysis target program P1. "Others" indicate execution sections in the application program other than the analysis target program P1. "IDLE" indicates that a specific application program is not executed (for example, only OS-related process is executed).

FIG. 9B illustrates a graph G2. The graph G2 is another output example of the analysis results. For example, the analysis section 170 divides the entire analysis target time by a predetermined time interval, and acquires the ratio of a frequency in which each execution section is observed for each predetermined time interval in the predetermined time interval in the same manner as in FIG. 9A. The analysis section 170 displays the results of calculation for the ratio at every predetermined time interval on the display 11 as a histogram which is illustrated in graph G2.

In a case where the histogram, such as graph G2, according to the elapse of time is output, the data collection section 150 registers time, in which the collection data is acquired, in each record of the collection data table 111. In addition, the analysis target data extraction section 160 registers the time in each record of the analysis target data table 121. If so, the analysis section 170 can calculate a ratio of the frequency in which each execution section is observed at every predetermined time interval based on the analysis target data table 121.

According to graph G2, a developer of a program can easily specify the program section, in which the amount of electric power consumption is relatively large, from display content during a relatively short period. According to the display example of FIG. 9B, it is easily understood that the amount of electric power consumption is excessively increased during a relatively short period in which the execution sections A and B are being executed. Therefore, the developer can easily specify program codes or the like corresponding to the execution sections A and B as candidates of a reconsideration target.

Meanwhile, the analysis section 170 can change the predetermined time interval (bin width of the histogram) into an arbitrary width. In addition, one or more analysis target programs may be executed in the analysis target time. For example, it is possible to execute a plurality of analysis target programs in parallel by the analysis apparatus 100, and perform profiling. In this case, the analysis section 170 can display graph G1 and graph G2, which include execution sections for the respective analysis target programs, on the display 11. For example, the analysis section 170 may separately display respective ratios of the execution sections A, B, C, . . . of the analysis target program P1 and respective ratios of a plurality of execution sections of another analysis target program on one graph.

In addition, it is possible to display the result of another type of base event, such as a cache miss, using the same graphs as in FIGS. 9A and 9B. For example, it is possible to display a cache miss occurrence frequency and a ratio of the occurrence frequency for each execution section of the program.

Subsequently, a procedure of a process which is performed by the analysis apparatus 100 will be described. A procedure illustrated in FIG. 10 is executed while the analysis target program P1 is being executed.

Figure 10:
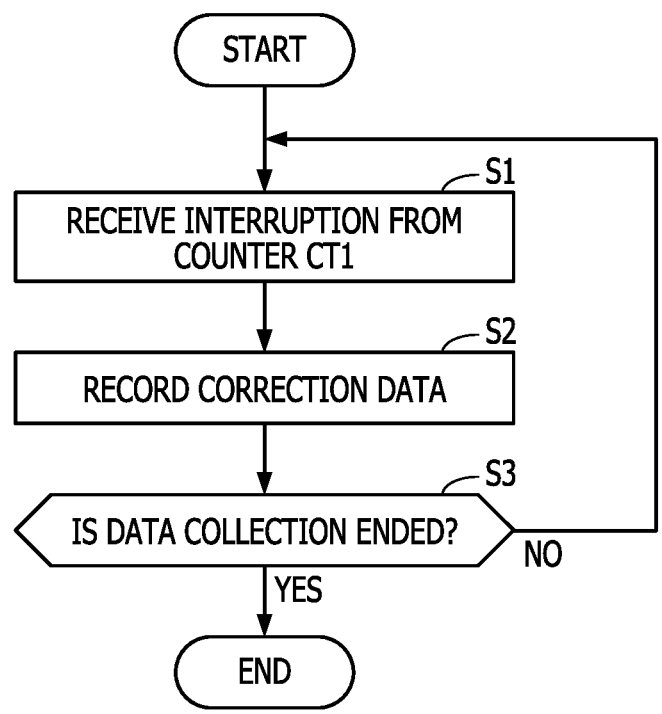
FIG. 10 is a flowchart illustrating an example of data collection according to the second embodiment.

FIG. 10 is a flowchart illustrating an example of the data collection according to the second embodiment. Hereinafter, the process illustrated in FIG. 10 will be described according to step numbers.

(S1) The data collection section 150 receives interruption from the counter 101a (counter CT1).

(S2) The data collection section 150 acquires collection data and records the collection data in the collection data table 111 which is stored in the collection data storage section 110. The collection data includes, for example, the CPU ID, the process ID, and a value of the program counter. In addition, the collection data includes a section count value of the counter 101b. As illustrated in FIGS. 9A and 9B, the data collection section 150 may associate the collection data with collection time and record the collection data in the collection data table 111.

(S3) The data collection section 150 determines whether or not to end the data collection. In a case where the data collection ends, the process ends. In a case where the data collection does not end, the process proceeds to S1. For example, in a case where the execution of the analysis target program P1 ends, the data collection ends.

The counter 101a generates hardware interruption based on counter overflow at every fixed time interval, and thus the data collection section 150 executes the procedures of S1, S2, and S3 at every fixed time interval.

In this manner, the collection data is recorded in the collection data table 111. The analysis target data extraction section 160 extracts the analysis target data from the collection data table 111 based on the section count value of the counter 101b. The analysis apparatus 100 executes the extraction of the analysis target data after the execution of the analysis target program P1 ends.

Figure 11:
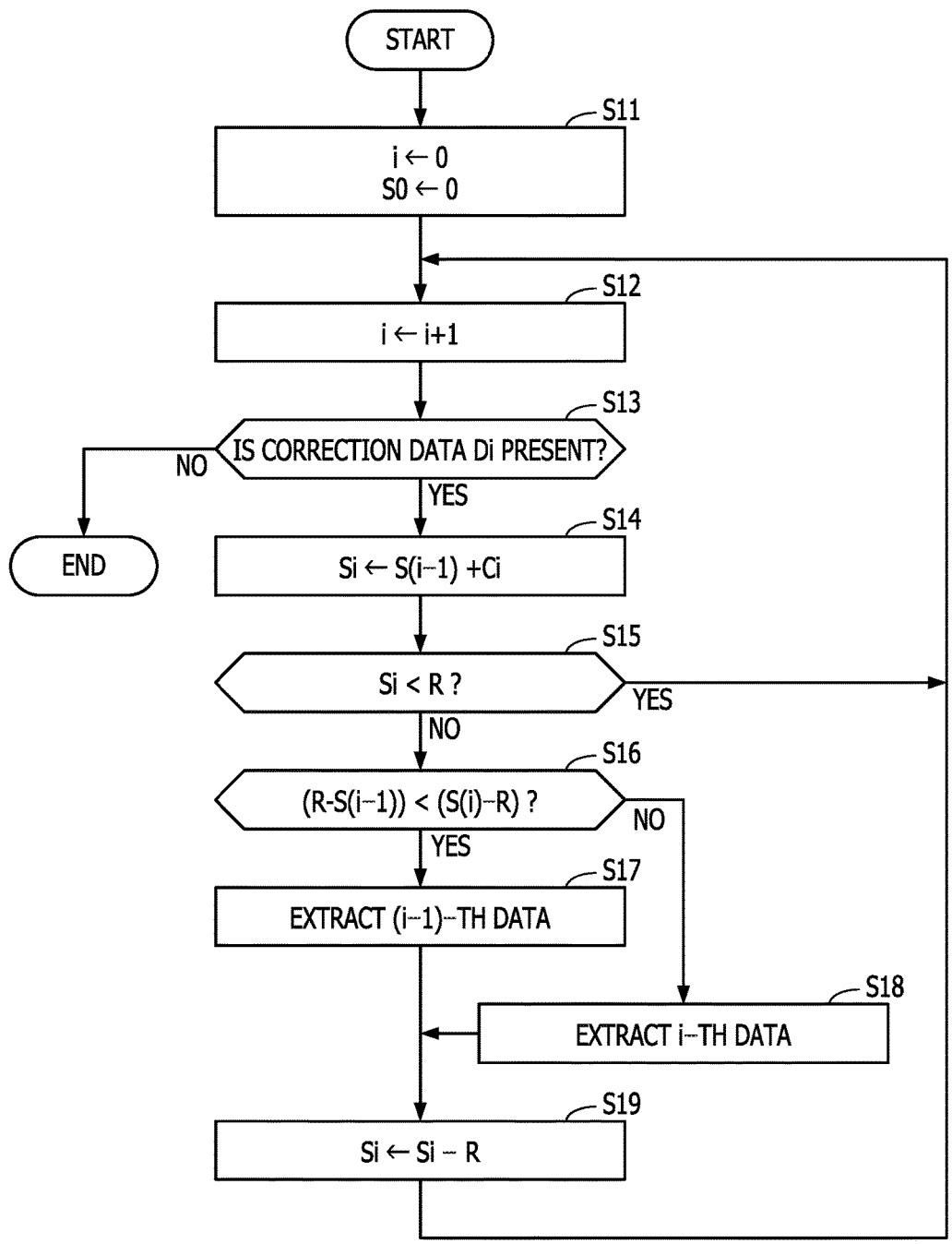
FIG. 11 is a flowchart illustrating an example of analysis target data extraction according to the second embodiment.

FIG. 11 is a flowchart illustrating an example of the analysis target data extraction according to the second embodiment. Hereinafter, the process illustrated in FIG. 11 will be described according to step numbers.

(S11) The analysis target data extraction section 160 substitutes 0 for a variable i. The variable i is a value corresponding to the sample number (there is a case of referring to as a "sample number i"). The analysis target data extraction section 160 substitutes 0 for a variable S0. The variable S0 is an initial value of a variable Si. The variable Si is an integrated value of the section count value of the counter 101b corresponding to the sample number which is displayed by the variable i (there is a case of referring to as an "integrated value Si").

(S12) The analysis target data extraction section 160 substitutes i+1 for the variable i. The process is referred to as a process for increasing the variable i. Otherwise, the process is referred to as a process for substituting a result, which is acquired by adding 1 to the variable i, for the variable i.

(S13) The analysis target data extraction section 160 determines whether or not collection data Di is present with reference to the collection data table 111. In a case where the collection data Di is present, the process proceeds to S14. In a case where the collection data Di is not present, the process ends. Here, the collection data Di corresponds to a record of the sample number i in the collection data table 111.

(S14) The analysis target data extraction section 160 substitutes a "variable S(i−1)+ the section count value Ci" for the variable Si. The section count value Ci is the section count value in a record of the sample number i. The process may be referred to as a process for acquiring the integrated value Si of the section count values until this time by adding the current section count value Ci to the integrated value S(i−1) of the section count values until immediately before time.

(S15) The analysis target data extraction section 160 determines whether or not the value, which is substituted for the variable Si, is smaller than a threshold R (Si<R). In a case where the value is smaller than the threshold R, the process proceeds to S12. In a case where the value is not smaller than the threshold R, that is, in a case where the value, which is substituted for the variable Si, is equal to or greater than the threshold R (Si≥R), the process proceeds to S16. The threshold R is information which is stored in the RAM 102, the HDD 103, or the like in advance as a value which determines an event-based sampling rate.

(S16) The analysis target data extraction section 160 determines whether or not a result of an arithmetic operation (R−S(i−1)) is smaller than that of an arithmetic operation (S(i)−R), that is, (R−S(i−1)<S(i)−R). In a case where the result of the arithmetic operation (R−S(i−1)) is smaller than that of the arithmetic operation (S(i)−R), the process proceeds to S17. In a case where the result of the arithmetic operation (R−S(i−1)) is not smaller than that of the arithmetic operation (S(i)−R), that is, in a case where the result of the arithmetic operation (R−S(i−1)) is equal to or greater than that of the arithmetic operation (S(i)−R), that is, (R−S(i−1)≥S(i)−R), the process proceeds to S18. The process is referred to as a process for comparing a first difference between the threshold R and the integrated value S(i−1) of the section count values until immediately before time with a second difference between an integrated value S(i) of the section count values until this time and the threshold R. If the first difference is smaller than the second difference, the process proceeds to S17. If the first difference is equal to or greater than the second difference, the process proceeds to S18.

(S17) The analysis target data extraction section 160 extracts (i−1)-th (sample number i−1) collection data. The extracted collection data corresponds to the analysis target data (collection data, from which the section count value is not included, may be the analysis target data). The analysis target data extraction section 160 registers the extracted analysis target data in the analysis target data table 121 which is stored in the analysis target data storage section 120. As illustrated in FIGS. 9A and 9B, in a case where information of time, in which the data is collected, is registered in the collection data table 111, the analysis target data extraction section 160 may associate the analysis target data with time in which the data is collected, and may record the analysis target data in the analysis target data table 121. Furthermore, the process proceeds to S19.

(S18) The analysis target data extraction section 160 extracts i-th (sample number i) collection data. The extracted collection data corresponds to the analysis target data (collection data, from which the section count value is excluded, may be the analysis target data). The analysis target data extraction section 160 registers the extracted analysis target data in the analysis target data table 121 which is stored in the analysis target data storage section 120. As illustrated in FIGS. 9A and 9B, in a case where the information of time in which the data is collected is registered in the collection data table 111, the analysis target data extraction section 160 may associate the analysis target data with time in which the data is collected, and may register the analysis target data in the analysis target data table 121. Furthermore, the process proceeds to S19.

(S19) The analysis target data extraction section 160 substitutes "variable Si-threshold R" for the variable Si. That is, a value, which is acquired by subtracting the threshold R from the integrated value Si of the section count value until this time, is substituted for Si. Furthermore, the process proceeds to S12.

FIG. 12 is a diagram illustrating an example of the analysis target data extraction according to the second embodiment. FIG. 12 illustrates an example, acquired when certain analysis target data is extracted from the collection data table 111, in detail. The example of FIG. 12 illustrates the results of calculation (item of the integrated value of count) of the integrated value of the section count value (as illustrated in FIG. 12, the item of the integrated value of count may be provided in the collection data table 111), together with the collection data table 111. In addition, it is assumed that R=10000.

The analysis target data extraction section 160 acquires the integrated value of count with reference to the collection data table 111 in order of small sample number, associates the acquired integrated value of count with the sample number, and registers the integrated value of count in the collection data table 111. In addition, the analysis target data extraction section 160 detects the sample number in which the integrated value of count exceeds the threshold R. The analysis target data extraction section 160 detects that the integrated value of count S(N) is "11660" and exceeds the threshold R=10000 in a sample number N.

If so, the analysis target data extraction section 160 acquires an integrated value of count S(N−1) "9860" of a sample number N−1 from the collection data table 111, and acquires a difference from the R=10000, that is, 10000−9860=240. In addition, the analysis target data extraction section 160 acquires a difference between the integrated value of count "11660" of the sample number N and R=10000, that is, 11660−10000=1660. The analysis target data extraction section 160 compares the difference 240 with the difference 1660 ((1) in FIG. 12).

Since the difference 240<the difference 1660, the analysis target data extraction section 160 uses the analysis target data candidate of the sample number N−1 as the analysis target data ((2) in FIG. 12). Furthermore, the analysis target data extraction section 160 subtracts the threshold R=10000 from the integrated value of count S(N). In this case, the integrated value of count S(N+1) in a sample number N+1 is a section count value C(N+1)=70, and thus S(N+1)=11660−10000+70=1730 ((3) in FIG. 12). The analysis target data extraction section 160 extracts the analysis target data by sequentially executing the process illustrated in FIG. 12 on respective records of subsequent sample numbers.

Figure 13:
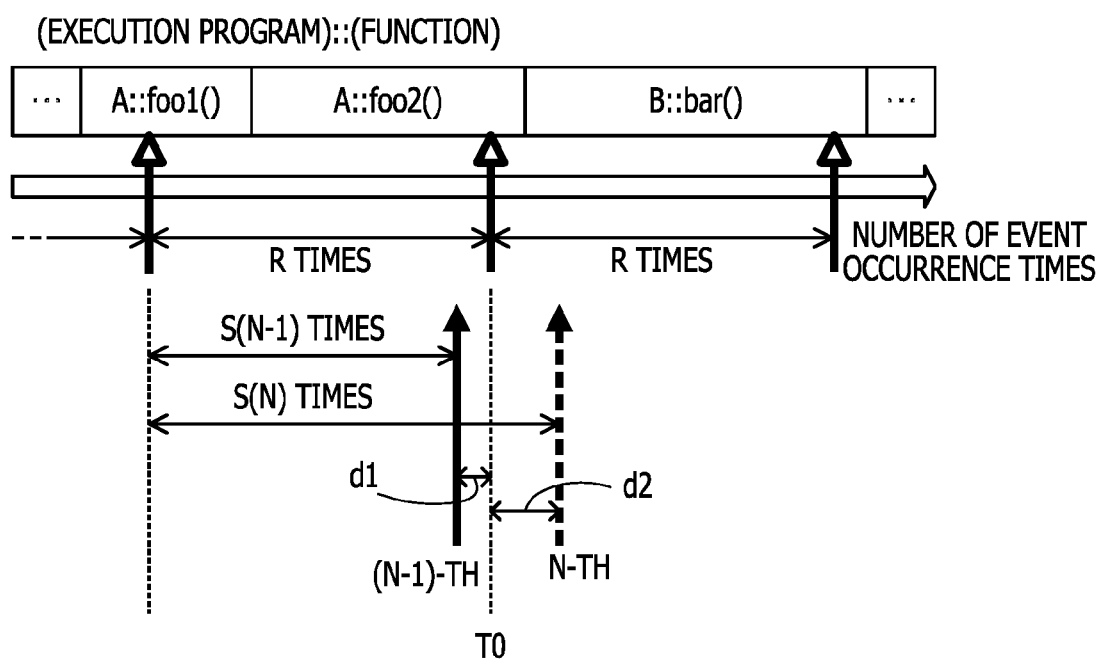
FIG. 13 is a diagram illustrating an example of the analysis target data extraction (continuation) according to the second embodiment.

FIG. 13 is a diagram illustrating an example of the analysis target data extraction (continuation) according to the second embodiment. FIG. 13 illustrates a program which is being executed and a function of the program through expression of "(execution program)::(function)". A direction of an axis which indicates the number of base event occurrence times (the number of event occurrence times in FIG. 13) is the same as the direction of a time axis. A direction which faces from the left side to the right side on the sheet of FIG. 13 is the direction of the time axis. For example, a rectangle, to which "A::foo1( )" is given, indicates a period in which a function of a function name foo1( ) of a program A is executed. That is, FIG. 13 illustrates that the function of the function name foo1( ) of the program A, a function of a function name foo2( ) of the program A, and a function of a function name bar( ) of a program B are executed in this order.

The threshold R is a value for determining the sampling rate of sampling based on the number of base event occurrence times. For example, a base event, in which the amount of electric power corresponding to one unit (for example, 1 joule) is consumed, is considered. If R=10000, the analysis target data is extracted whenever the amount of electric power corresponding to 10000 units (for example, 10000 joules) is consumed. However, the counter 101b does not have the hardware interruption function, and thus timing in which the number of base event occurrence times is exactly 10000 is not always measured.

Specifically, it is assumed that the integrated value S(N) of the section count value of the counter 101b (integrated value of count S(N)) exceeds a sampling rate R (threshold R) at a point of time of the sample number N (N-th). However, a point of time in which the collection data of the sample number N is acquired is a point of time which is later than a timing (original timing) in which the number of base event occurrence times is exactly 10000. Therefore, the process is advanced rather than the original timing, and thus there is a possibility that content of the collection data is different from content at the original timing. For example, in FIG. 13, timing T0 is original timing. Furthermore, if the collection data of the sample number N is used, wrong information in which the function of the function name bar( ) of the program B is executed is acquired regardless that the function of the function name foo1( ) of the program A is executed at timing T0.

Here, the analysis target data extraction section 160 compares a difference di between the threshold R and the integrated value S(N−1) at a point of time of the sample number N−1 ((N−1)-th) with a difference d2 between the integrated value S(N) and the threshold R. In the example of FIG. 13, d1<d2. Therefore, the analysis target data extraction section 160 uses the collection data of the sample number N−1 as the analysis target data instead of the collection data of the sample number N. The collection data of the sample number N−1 indicates that the function of function name foo1( ) of the program A is executed, and thus it is possible to appropriately extract the analysis target data rather than a case where the collection data of the sample number N is used.

Figure 14A:
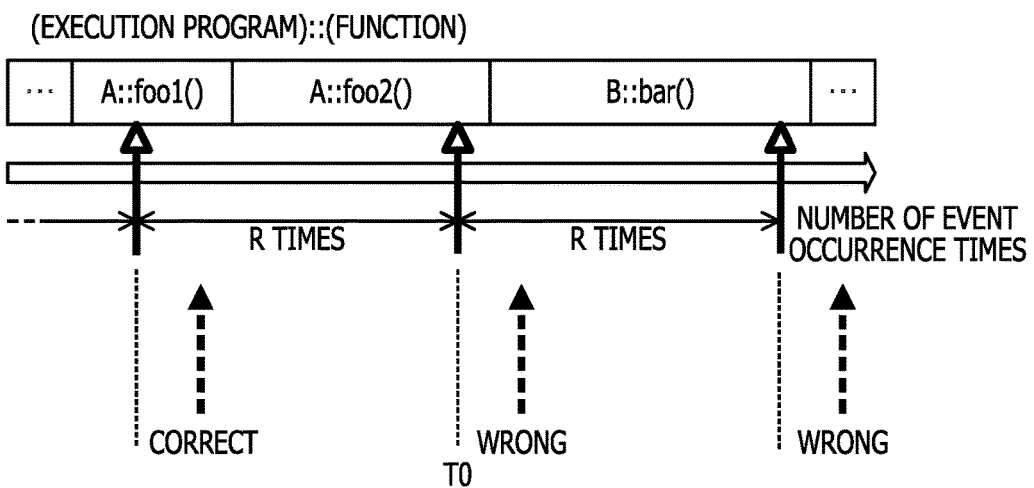
FIGS. 14A and 14B are diagrams illustrating comparative examples of sampling.
Figure 14B:
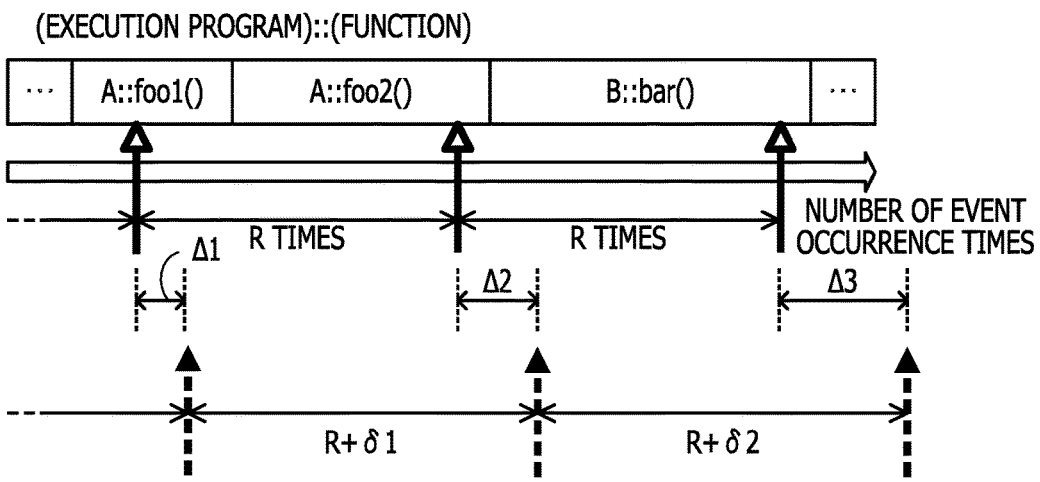

FIGS. 14A and 14B are diagrams illustrating comparative examples of sampling. FIG. 14A illustrates an example in which the analysis target data is extracted without performing comparison of the differences d1 and d2. In the example of FIG. 14A, the record of the sample number N is considered as the analysis target data in a case where the integrated value S(N) of the section count value of the counter 101b exceeds the threshold R. If so, as described above, at the original timing T0, wrong information in which the function of the function name bar( ) of the program B is executed is acquired regardless that the function of the function name foo2( ) of the program A is executed.

Furthermore, FIG. 14B illustrates a situation in which delay from the original timing gradually increases in a case where the analysis target data is extracted without performing comparison of the differences d1 and d2. For example, the integrated value S(i) may be reset to 0 at every timing in which the analysis target data is extracted, and the integrated value S(i) may be calculated from the timing. However, if the integrated value S(i) is calculated in this manner, delay from the original timing of the timing, in which the analysis target data is extracted, gradually increases. FIG. 14B illustrates delays Δ1, Δ2, and Δ3, and Δ1<Δ2<Δ3. The reason that such a delay occurs is that timing, in which the analysis target data is extracted, is delayed from the original timing and the timing in which the analysis target data is extracted is determined while the delay amount (δ1 and δ2 in FIG. 14B)) is integrated.

In contrast with the comparative example of FIGS. 14A and 14B, it is possible to more appropriately extract the analysis target data according to the analysis apparatus 100 as illustrated in FIG. 13. The analysis apparatus 100 can raise the reliability of evaluation based on latter stage profiling by accumulating the more appropriate analysis target data. In addition, in a case where the integrated value S(N) exceeds the threshold R, the analysis apparatus 100 calculates the integrated value S(N+1) using a valued acquired by subtracting the threshold R from the integrated value S(N). Therefore, it is possible to suppress the enlargement of the delay illustrated in FIG. 14B (because it is possible to suppress the integration of δ1 and δ2 illustrated in FIG. 14B). As a result, it is possible to suppress deviation from the original timing of the timing in which the analysis target data is extracted (timing in which the integrated value S(i) exactly exceeds the threshold R).

Figure 15A:
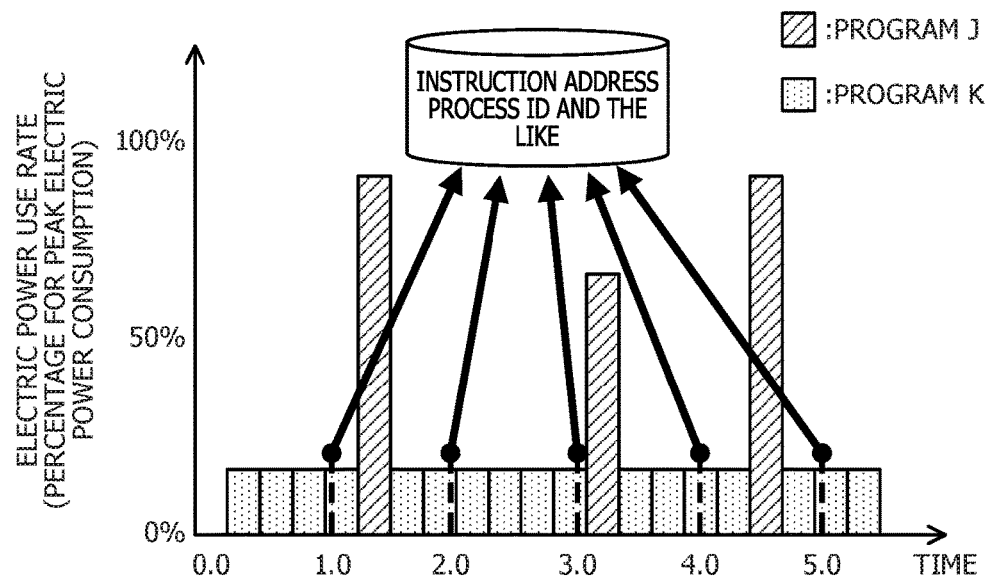
FIGS. 15A and 15B are diagrams illustrating comparative examples of a sampling method.
Figure 15B:
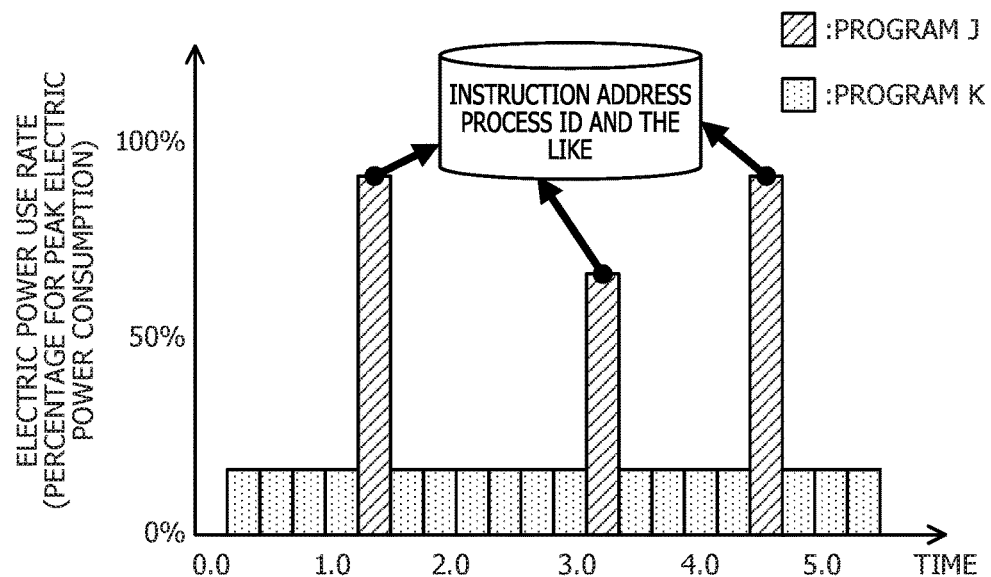

FIGS. 15A and 15B are diagrams illustrating comparative examples of a sampling method. FIG. 15A illustrates an example of time-based sampling. In the time-based sampling, the operation information, such as the instruction address, the process ID, and the amount of electric power consumption, is collected on a fixed cycle. However, in this method, it is not easy to acquire a hot spot (for example, a program section having large electric power consumption or a program section having high frequency of cache misses) for a specific event (for example, electric power consumption, cache miss, or the like). The reason for this is that sampling of the operation information is performed at timing (fixed cycle timing) which is not related to the event occurrence. That is, operation information at timing which is later than time in which a focused event occurs is acquired, and thus there is a possibility that content of the operation information is changed from time in which the focused event occurs.

In contrast, FIG. 15B illustrates an example of electric power consumption-based sampling. In the electric power consumption-based sampling, a count value, which indicates the amount of electric power consumption, is counted by a PMC or the like, and the sampling of the operation information is performed whenever the amount of electric power consumption exceeds fixed amount. In the counter, such as the counter 101b, which does not have the hardware interruption function, it is difficult to generate interruption which is the trigger for acquiring the operation information. Therefore, a counter for a timer, which has a count overflow interruption function, may be used. Specifically, the count value of the counter 101b is acquired at timing according to the interruption generated by the counter for the timer, and the operation information is acquired at timing according to the count value. However, in the method, finally, the operation information at timing which is later than the time in which the focused event occurs is acquired, and thus there is a possibility that the content of the operation information is changed from the time in which the focused event occurs.

According to the analysis apparatus 100, in a case where the electric power consumption-based sampling is performed, current operation information or immediately previous operation information is selected as the operation information to be collected by taking the possibility that the content of the operation information is changed into consideration. Therefore, even in a case where the counter 101b which does not have the hardware interruption function is used to measure the trigger for sampling, it is possible to select and acquire more appropriate operation information. It is possible to improve reliability for the result of profiling by performing the latter stage profiling using the operation information which is acquired as described above.

In addition, in the collection data table 111, a plurality of samples during a period, in which the analysis target program P1 is executed, are registered. Therefore, if the collection data table 111 is prepared at once, profiling is performed according to the electric power consumption-based sampling based on the collection data table 111. For example, it is possible to extract the analysis target data again by changing the threshold R.

Third Embodiment

Hereinafter, a third embodiment will be described. Parts which are different from the above-described second embodiment will be mainly described, and common parts will not be described.

In the third embodiment, a function for correcting a part of information included in the collection data and acquiring the more appropriate analysis target data is provided. Here, since the hardware example of an analysis apparatus according to the third embodiment is the same as the hardware example of the analysis apparatus according to the second embodiment illustrated in FIG. 3, the description thereof will not be repeated. In third embodiment, the same components are indicated using the same reference symbols and names as in the second embodiment. However, in the third embodiment, a fact that the analysis apparatus 100 corrects a part of collected data based on information which is referred to as branch trace information is different from the second embodiment.

Figure 16:
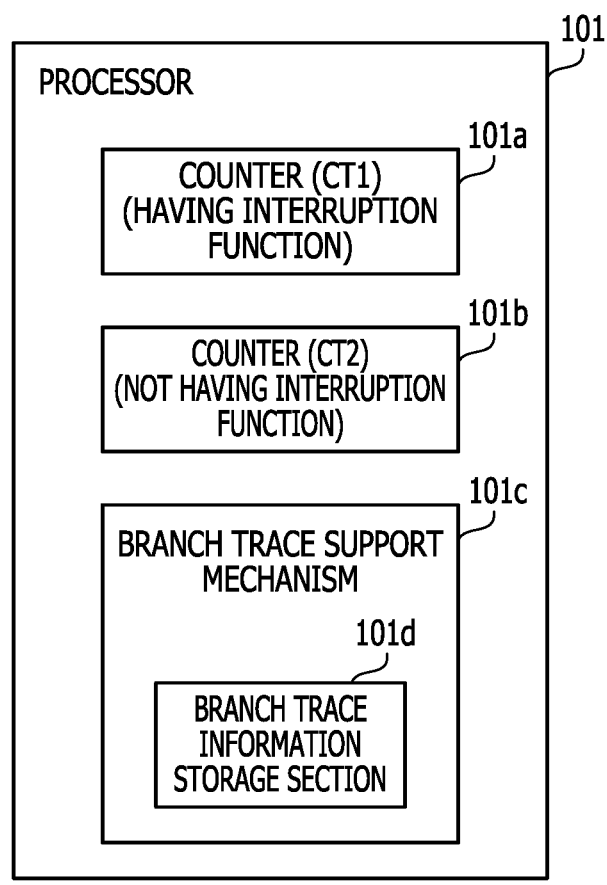
FIG. 16 is a diagram illustrating an example of a processor according to a third embodiment.

FIG. 16 is a diagram illustrating an example of a process according to the third embodiment. The processor 101 includes a branch trace support mechanism 101c in addition to the counters 101a and 101b. The branch trace support mechanism 101c collects branch trace information of a program execution instruction. There is a case where the branch trace support mechanism 101c is called a Last Branch Record (LBR). The branch trace support mechanism 101c includes a branch trace information storage section 101d.

The branch trace information storage section 101d stores the branch trace information. The branch trace information is information indicative of a pair of an address (branch source address: From address), at which an instruction of a branch source is stored, and an address (branch destination address: To address) at which an instruction of a branch destination is stored. The branch trace information storage section 101d may be a dedicated register which stores the branch trace information. There is a case where the register is referred to as a LBR register. The branch trace information storage section 101d may be a storage area which is secured in the RAM 102 or the like. There is a case where the storage area, which is secured in the RAM 102 or the like, is referred to as a Branch Tree Store (BTS). If the branch trace support mechanism 101c is used to collect the branch trace information, it is possible to reduce overhead of application processing time compared to a case where, for example, a method (single step on branch) for collecting the branch trace information by detecting trap whenever branch is established is used.

Meanwhile, in the description below, there is a case where a predetermined instruction group which is executed by the analysis apparatus 100 is referred to as a "basic block". The basic block is an instruction group (that can be referred to as an "instruction block") which is sequentially executed without being branched in the middle of an instruction string, and is a set of respective instructions from an instruction immediately after a certain branch to an instruction which is subsequently branched. Here, there is conditional branch on the instruction string, and thus it is difficult to statically acquire the basic block in advance. Therefore, the analysis apparatus 100 extracts the basic block based on branch trace information which is collected while the analysis target program P1 is executed or branch trace information which is acquired through simulation. For example, in the branch trace information, an area from a branch destination address of a certain record to a branch source address of a subsequent record is the basic block.

Figure 17:
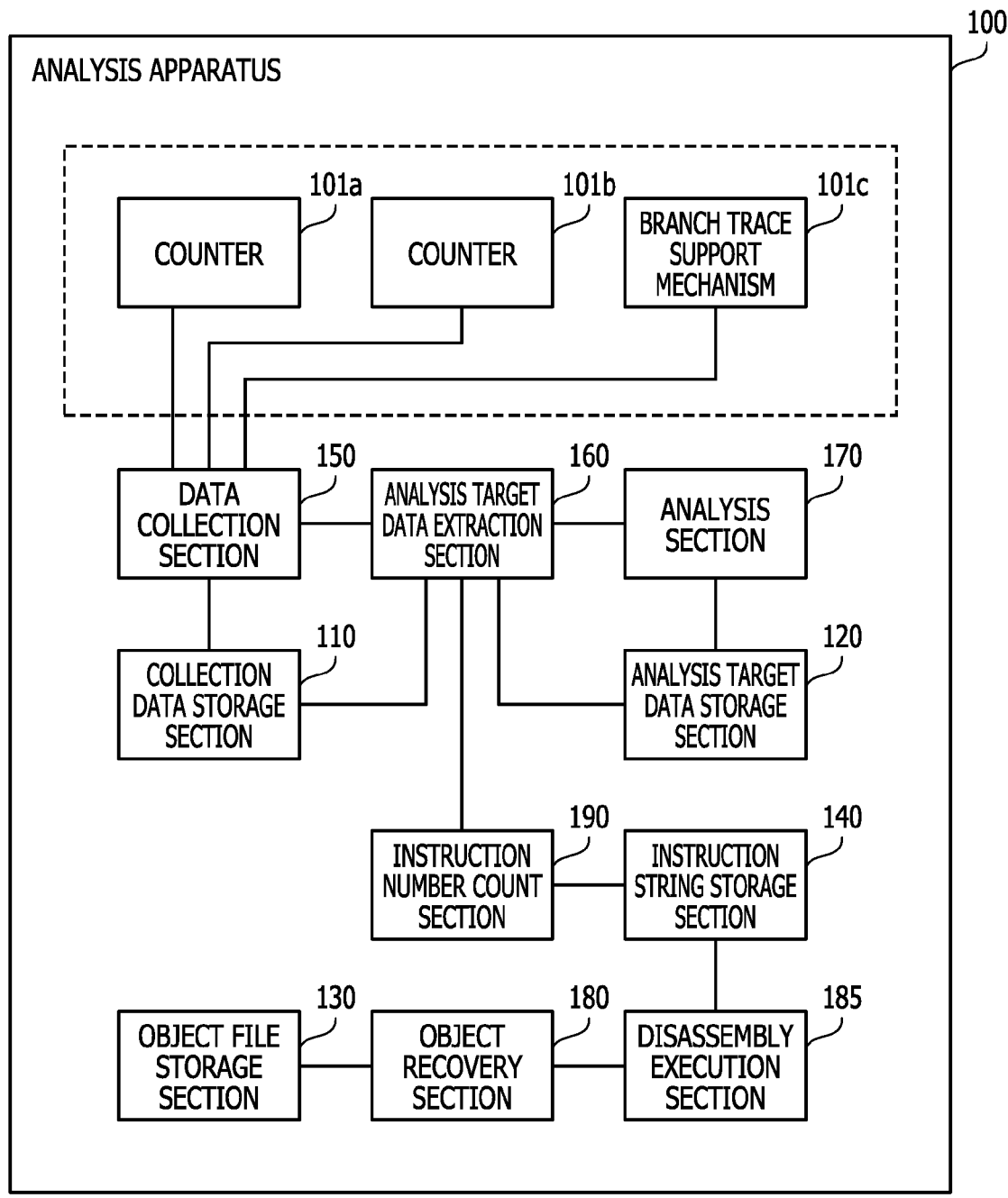
FIG. 17 is a diagram illustrating an example of a function of an analysis apparatus according to the third embodiment.

FIG. 17 is a diagram illustrating an example of the function of the analysis apparatus according to the third embodiment. The analysis apparatus 100 according to the third embodiment includes a collection data storage section 110, an analysis target data storage section 120, an object file storage section 130, an instruction string storage section 140, a data collection section 150, an analysis target data extraction section 160, an analysis section 170, an object recovery section 180, a disassembly execution section 185, and an instruction number count section 190. Since the collection data storage section 110, the analysis target data storage section 120, the data collection section 150, the analysis target data extraction section 160, and the analysis section 170 are the same as the respective sections having the same names and the same reference symbols illustrated in FIG. 5, the description thereof will not be repeated.

However, in a case where the data collection section 150 receives interruption from the counter 101a, the data collection section 150 collects the branch trace information from the branch trace support mechanism 101c in addition to information of a process and the count value of the counter 101b (the amount of electric power consumption), and stores the branch trace information in the collection data storage section 110. Here, in the example of the third embodiment, it is assumed that process IDs which are included in respective collection data collected by the data collection section 150 are the same. In a case where the analysis target data extraction section 160 extracts the analysis target data, the analysis target data extraction section 160 causes the instruction number count section 190 to correct a part of the information (the address value of the program counter) included in the collection data (This will be described later).

The object file storage section 130 and the instruction string storage section 140 are realized as the storage areas which are secured in the RAM 102 and the HDD 103. The object recovery section 180, the disassembly execution section 185, and the instruction number count section 190 are realized in such a way that a CPU 101 executes a program which is stored in the RAM 102.

The object file storage section 130 stores an object file of the analysis target program P1. The object recovery section 180 acquires the object file of the analysis target program P1, which is stored in the object file storage section 130, and provides the object file to the disassembly execution section 185. The disassembly execution section 185 executes a disassembly process by inputting the object file. The disassembly execution section 185 generates information (there is a case of being referred to as an "assembly list") of the instruction string corresponding to the object file as a result of the disassembly process, and stores the information in the instruction string storage section 140. The information of the instruction string is information acquired by associating an address on the RAM 102 with content of the instruction.

The instruction number count section 190 acquires the collection data which is extracted by the analysis target data extraction section 160, and corrects the address value which is included in the collection data based on the collection data and the information of the instruction string which is stored in the instruction string storage section 140. The instruction number count section 190 responds to the analysis target data extraction section 160 with the address value which is acquired after correction. The analysis target data extraction section 160 stores the collection data, which includes the address acquired after correction performed by the instruction number count section 190, in the analysis target data storage section 120 as the analysis target data.

Figure 18:
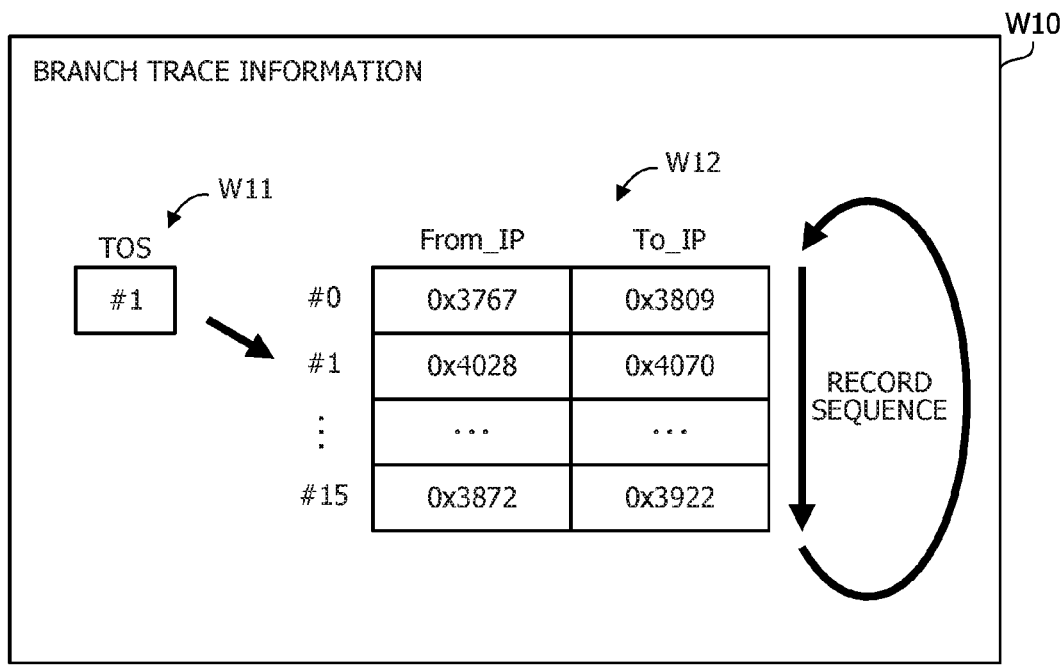
FIG. 18 is a diagram illustrating an example of branch trace information according to the third embodiment.

FIG. 18 is a diagram illustrating an example of the branch trace information according to the third embodiment. Branch trace information W10 is stored in the branch trace information storage section 101d. Branch trace information W10 includes Top Of Stack (TOS) information W11 and address pair information W12.

The TOS information W11 stores an index (TOS) which indicates the last record section in a register stack in which the address pair information W12 is stored. In the example of FIG. 18, index "#1" is stored in the TOS information W11. The TOS information W11 is recorded in a dedicated register.

The address pair information W12 is information which is acquired by associating a source of an executed branch (a branch instruction address of the branch source) with a target (an instruction address of the branch destination). The address pair information W12 is recorded in a dedicated register stack by the branch trace support mechanism 101c. For example, in the register stack, 16 pairs of (the respective pairs are expressed by indexes #0 to #15) branch addresses can be recorded. In addition, the register stack can be cyclically used. For example, the address pairs are stored in sequence of #0, #1, #2, . . . . After the address pair is stored for #15, the sequence is returned to #0, and the address pairs are overwritten and recorded. If a new address pair is stored in the register area for any one of indexes of the address pair information W12, the TOS information W11 is updated. For example, at this time, in a case where a new address pair is stored in a register area of #5, the branch trace support mechanism 101c records an index "#5" as the TOS information W11.

Meanwhile, the data collection section 150 can instruct the branch trace support mechanism 101c to refine a branch instruction which is a collection target. For example, the data collection section 150 can perform filtering setting, such as a privilege level (an OS mode, a user mode, and the like) in which the type (non-conditional branch/conditional branch/call/return, or the like) of the branch instruction, which is the collection target, or the branch instruction is executed. In addition, the data collection section 150 can instruct the branch trace support mechanism 101c to start the collection of the branch trace information, to stop the collection, and the like.

FIG. 19 is a diagram illustrating an example of instruction string information according to the third embodiment. Instruction string information 141 is stored in the instruction string storage section 140. The instruction string information 141 includes items of an address and an instruction. The item of the address indicates an address at which an instruction is stored. The item of the instruction indicates the content of the instruction. Here, numbers on the right side of the instruction string information 141 on the sheet are line numbers. In the instruction string information 141, it is indicated that each instruction is executed in ascending order (order going from an upper line to a lower line) of the line numbers (However, there is a case where the process jumps from a line in which the line number is large to a line in which the line number is small).

For example, in the second line of the instruction string information 141, information in which the address is "0x4018" and the instruction is "add" is registered. The information indicates that the content of the instruction of the address "0x4018" is an add instruction.

In addition, for example, in the fourth line of the instruction string information 141, information in which the address is "0x4028" and the instruction is "Jmp A" is registered. The information indicates that the content of the instruction of the address "0x4028" is a branch instruction to transition to an address indicated as "A: . . . ". In the example of the instruction string information 141, transition to a seventh line "A: 0x4070" is performed. After the transition to the address "A: 0x4070", instructions after eighth line are sequentially executed.

FIG. 20 is a diagram illustrating an example of the collection data table according to the third embodiment. A collection data table 111a is stored in the collection data storage section 110 instead of the collection data table 111. The collection data table 111a includes items of a sample number, an analysis target data candidate, a section count value, and branch trace information of each section. Here, pieces of information, which are registers in the items of the sample number, the analysis target data candidate, and the section count value, are the same as the pieces of information which are registered in the same name items of the collection data table 111 illustrated in FIG. 7. Therefore, the description thereof will not be repeated.

In the item of the branch trace information of each section, an address pair of the branch source address and the branch destination address is registered. In the item of the branch trace information of each section, the address pair corresponding to difference between immediately previous data collection and current data collection is registered. Therefore, there is a case where the number of address pairs of the branch trace information of each section that is included in each record of the collection data table 111a differs for each record.

For example, in the collection data table 111a, information, in which the sample number is "N−1", the CPU ID of the analysis target data candidate is "0", the PID is "219", the PC is "0x4110", the section count value is "140", the branch trace information of each section is "(From_1 0x40c0, To_1 0x40d8), (From_2 0x40da, To_2 0x40e0), . . . , (From_k 0x40f8, To_k 0x40fa)" (k is an integer which is equal to or greater than 3), is registered.

The information is collection data acquired when (N−1)-th interruption is received from the counter 101a, and indicates that the CPU ID is "0", the process ID is "219", the value of the program counter is "0x4110", the section count value of the counter 101b is "140". Furthermore, the information indicates that, after immediately previous data collection timing, branch from an address "0x40c0" to an address "0x40d8", branch from an address "0x40da" to an address "0x40e0", . . . , branch from an address "0x40f8" to an address "0x40fa", that is, (k+1) times of branches occur. However, there is a case where the number of occurring branches is one or two.

Here, for example, it is assumed that, in a record of the sample number N of the collection data table 111a, the number of address pairs which are registered in each section is M (M is an integer which is equal to or greater than 1). In this case, in the record, M×2 addresses from an address pair of From_1/To_1 to the address pair of From_M/To_M are included.

In addition, in order to express the branch trace information for each section in the record of the sample number N, sample number N is attached to a prefix of an address like "N_From_1", "N_To_1", "N_From_M", and "N_To_M".

As described above, in the executed instruction string, an instruction string unit, which does not include branch on the way, is assumed as a basic block. For example, an instruction string from an address of To_1 to an address of From_2 corresponds to one basic block.

That is, an instruction string from a certain branch destination address To_(m−1) (m is an integer which is equal to or greater than 1) to a subsequent branch source address From_m is the basic block. Here, an instruction string from N_To_(m−1) to N_From_m is a basic block "N_BLK_m" based on the branch trace information for each section which is included in the record of the sample number N.

Furthermore, the address value of the program counter in the sample number N−1 is N_To_0 and the address value of the program counter in the record of the sample number N is N_From_(M+1). If so, the execution instruction string between (N−1)-th to N-th samplings is a set of the basic blocks N_BL_1 to N_BLK_(M+1). A value, which is acquired by counting a total instruction numbers which are included in the set in the instruction string information 141, is total instruction numbers P. The total instruction numbers P is the total instruction numbers which are executed between the basic blocks N_BLK_1 to N_BLK_(M+1).

Subsequently, a procedure of a process which is performed by the analysis apparatus 100 according to the third embodiment will be described. Since the procedure of the data collection according to the third embodiment is the same as the procedure of the data collection according to the second embodiment illustrated in FIG. 10, the description thereof will not be repeated.

Figure 21:
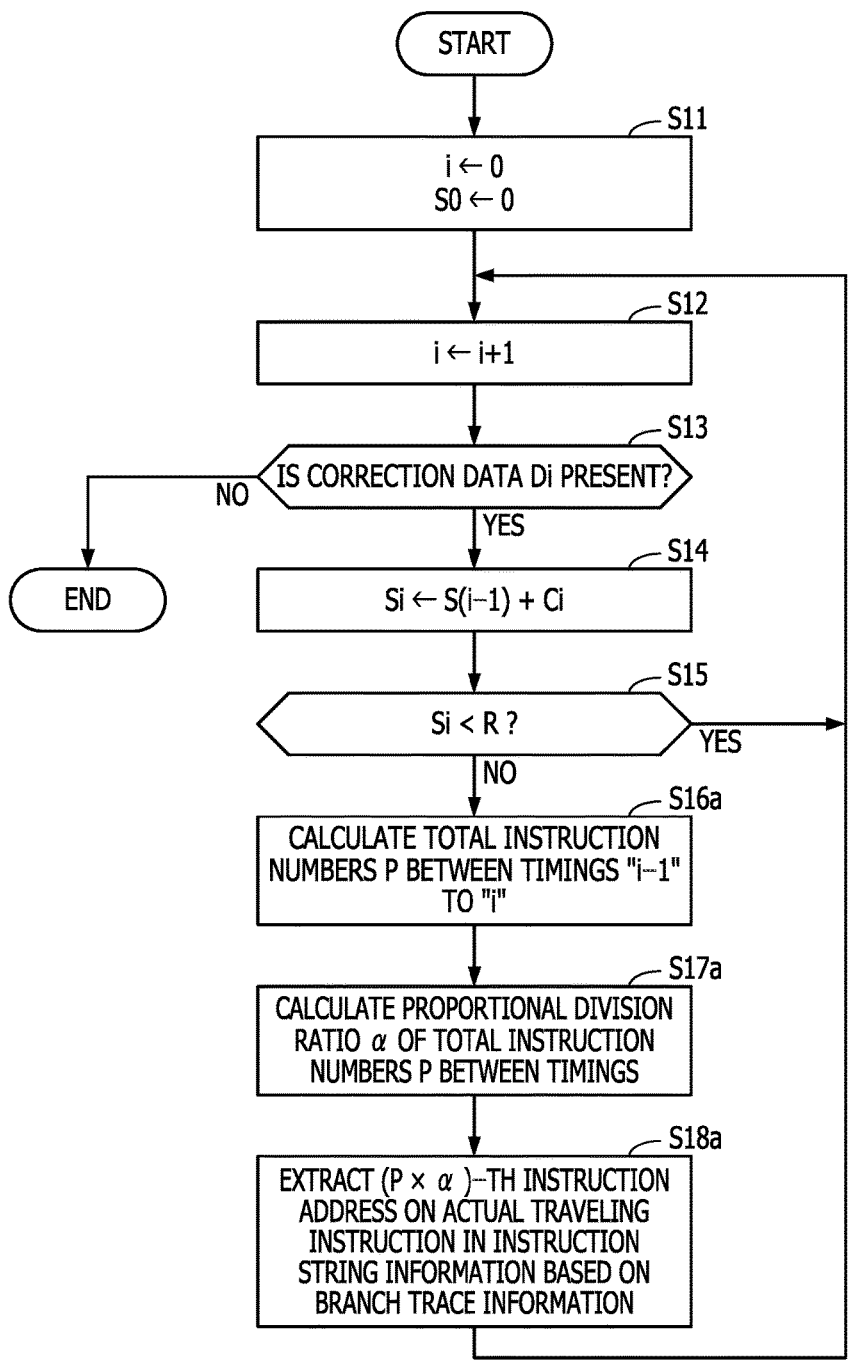
FIG. 21 is a flowchart illustrating an example of analysis target data extraction according to the third embodiment.

FIG. 21 is a flowchart illustrating an example of analysis target data extraction according to the third embodiment. Hereinafter, the process illustrated in FIG. 21 will be described according to step numbers. Here, the third embodiment is different from the second embodiment in that procedures in S16a, S17a, and S18a are executed instead of the procedures in S16 to S19 according to the second embodiment illustrated in FIG. 11. Here, S11 to S15 are not described. S16a is executed in a case of No in S15.

(S16a) The analysis target data extraction section 160 acquires a record of a sample number "i" from the collection data table 111, and provides the record to the instruction number count section 190. The instruction number count section 190 calculates the total instruction numbers P between timing in which collection data of a sample number "i−1" is acquired and timing in which collection data of the sample number "i" is acquired. A calculation method is the same as illustrated in FIG. 20. Meanwhile, as described above, process IDs which are included in the collection data acquired at both timings are the same.

(S17a) The instruction number count section 190 calculates a proportional division ratio α of the total instruction numbers P between the timing in which the collection data of the sample number "i−1" is acquired and the timing in which the collection data of the sample number "i" is acquired using Equation (1).

$$\alpha = \frac{R - S(i-1)}{S(i) - S(i-1)} \tag{1}$$

Here, R is the threshold corresponding to the sampling rate. $S(i-1)$ is the integrated value of the section count value of the counter 101b at timing of the sample number "i−1". $S(i)$ is the integrated value of the section count value of the counter 101b at timing of the sample number "i".

(S18a) The instruction number count section 190 extracts a (P×α)-th instruction address on an actual traveling instruction in the instruction string information 141 based on branch trace information W10. For example, the instruction number count section 190 searches the instruction string information 141 for address value N_To_0 of the program counter in the sample number "N−1". Furthermore, the instruction number count section 190 sequentially counts lines subsequent to a line corresponding to the address value N_To_0 of the instruction string information 141 until reaching a (P×α)-th line. At this time, if reaching the From address which is included in the branch trace information W10, the instruction number count section 190 performs count after performing transition to the To address. If the instruction number count section 190 reaches the (P×α)-th line in this manner, the instruction number count section 190 acquires an instruction address, which is included in the line, from the instruction string information 141, and responds to the analysis target data extraction section 160. The analysis target data extraction section 160 changes the address value of the program counter in the record of the sample number "i" of the collection data table 111 into the address value, which is acquired from the instruction number count section 190, and sets a record, which is acquired after change, to the analysis target data. The analysis target data extraction section 160 registers the analysis target data in the analysis target data table 121.

As described above, for example, in a case where the integrated value S(i) exceeds the threshold R when i=N, the analysis apparatus 100 corrects the address value of the program counter at timing using the proportional division ratio α. The address value acquired after correction is an address value of an instruction which is advanced as many as "P×α" instructions from the address value of the program counter which is observed at i=N−1 (immediately previous timing). Therefore, the analysis apparatus 100 can increase the accuracy of the address value which is acquired as the analysis target data.

Meanwhile, in the above example, the analysis apparatus 100 corrects the address value by advancing as many as "P×α" instructions from the address in the collection data of the sample number i=N−1. In contrast, the analysis apparatus 100 may correct the address value by returning as many as "P×β" instructions from the address in the collection data of the sample number i=N. β is a value which is calculated by exchanging elements of Equation (1) to "S(i)=R". In this case, the instruction number count section 190 counts the number of instructions by reversing the instruction string information 141 based on the branch trace information W10. The instruction number count section 190 may select correction of the address value in the collection data of the sample number i=N−1 or correction of the address value in the collection data of the sample number i=N according to comparison of (R−S(i−1)) and (S(i)−R). For example, it may be considered that a method of reducing searching costs is selected in such a way that the former correction is performed in a case where (R−S(i−1))<(S(i)−R), and the latter correction is performed in a case where (R−S(i−1))≥(S(i)−R), thereby reducing the costs of the correction process.

Fourth Embodiment

Hereinafter, a fourth embodiment will be described. Parts which are different from the above-described second and third embodiments will be mainly described, and common parts will not be described.

In the OS, there is a case where different address spaces are assigned to respective processes. In this case, address values are not treated for a plurality of processes on the analysis apparatus 100 in an integrated fashion but treated for the respective processes. For example, if process IDs are different, the address spaces are different. In this case, in a case where the process IDs are different between two timings (for example, between (i−1)-th and i-th timings) in which the data collection is performed, it may be difficult to use the method according to the third embodiment. For example, in a case where the process IDs are different between both timings, the address value of another process is expressed from a plurality of branch address pairs selected at i-th timing. However, it is difficult to specify a timing in which the process is switched. Here, in the fourth embodiment, a function of performing extraction by combining the methods according to the second and third embodiments is provided.

Here, since a hardware example of an analysis apparatus according to the fourth embodiment is the same as the hardware example of an analysis apparatus according to the second embodiment illustrated in FIG. 3, the description thereof will not be repeated. In the fourth embodiment, the same components are indicated using the same reference symbols and names as in the second embodiment. In addition, since an example of a function of an analysis apparatus 100 according to the fourth embodiment is the same as the example of the function according to the third embodiment illustrated in FIG. 17, the description thereof will not be repeated. However, the collection data table 111a is stored in the collection data storage section 110. Furthermore, since a procedure of the data collection according to the fourth embodiment is the same as the procedure of the data collection according to the second embodiment illustrated in FIG. 10, the description thereof will not be repeated. In the fourth embodiment, a process which is performed by the analysis target data extraction section 160 in a case where integrated value S(i)≥threshold R is different from those in the second and third embodiments.

Figure 22:
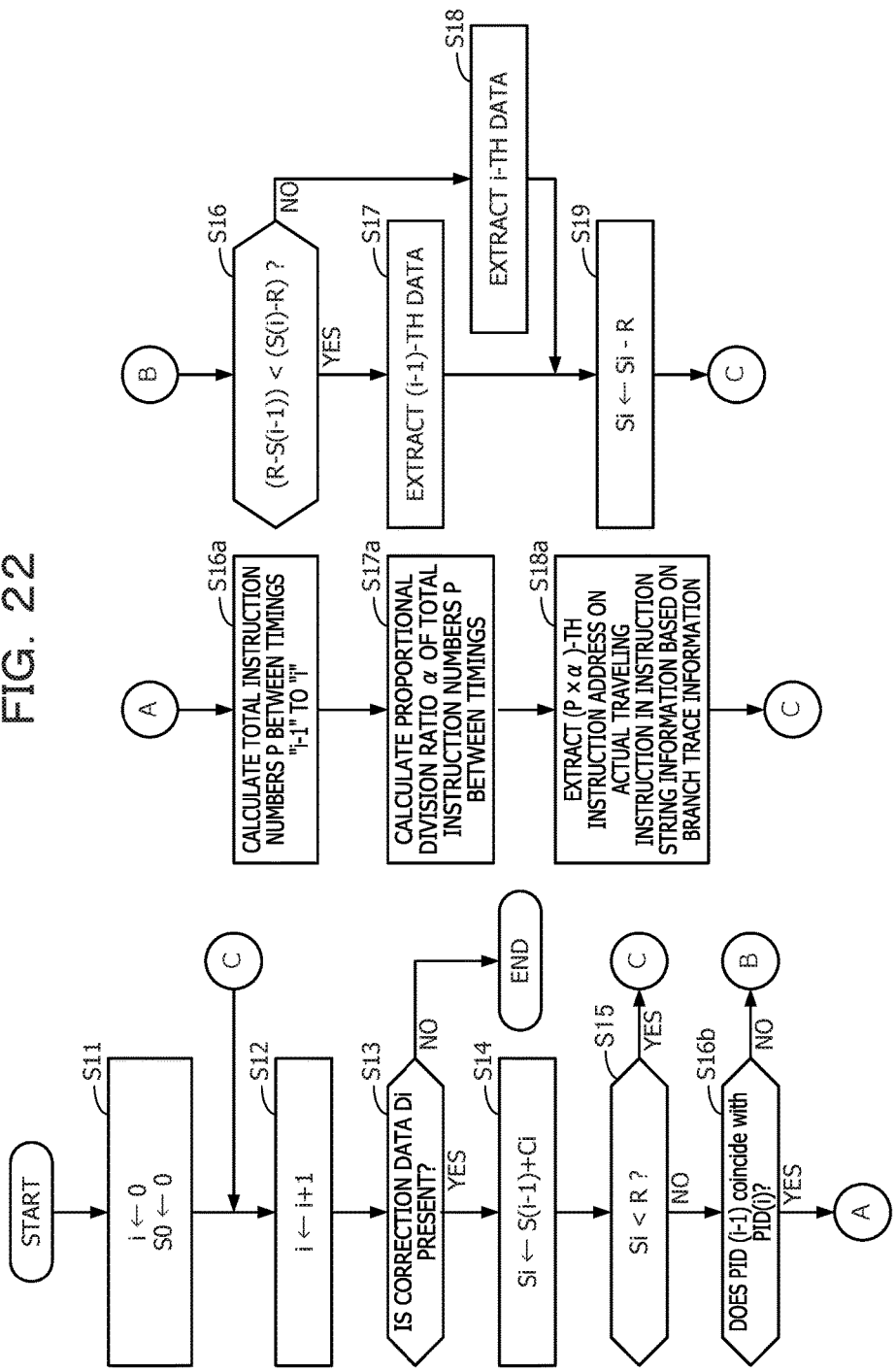
FIG. 22 is a flowchart illustrating an example of analysis target data extraction according to a fourth embodiment.

FIG. 22 is a flowchart illustrating an example of the analysis target data extraction according to the fourth embodiment. Hereinafter, the process illustrated in FIG. 22 will be described according to step numbers. The fourth embodiment is different from the second and third embodiments in that S16b is executed after S15 illustrated in FIGS. 11 and 21 is executed and one of S16 and S16a to be advanced is selected according to determination performed in S16b. Here, S16b will be described below and the description of other steps will not be repeated. S16b is executed in a case of No in S15.

(S16b) The analysis target data extraction section 160 compares a process ID ("PID(i−1)") of a record of the sample number "i−1" which is included in the collection data table 111 with a process ID ("PID(i)") of a record of the sample number "i", and determines whether or not the process IDs coincide with each other. In a case where the process IDs coincide with each other, the process proceeds to S16a. In a case where the process IDs do not coincide with each other, the process proceeds to S16.

The procedures subsequent to S16a are the same as in FIG. 21. If the analysis apparatus 100 executes processes in S16a to S18a, the process proceeds to S12. In addition, the procedures subsequent to S16 are the same as in FIG. 11. If the analysis apparatus 100 executes processes in S16 to S19, the process proceeds to S12.

In this manner, in a case where the integrated value Si exceeds the threshold R, the analysis apparatus 100 may select an analysis target data extraction method according to coincidence and anticoincidence of the process IDs. By this manner, in a case where the process IDs coincide with each other, it is possible to acquire more appropriate address information, and it is possible to more enhance the reliability of profiling of latter stages. In contrast, in a case where the process IDs do not coincide with each other, it is possible to perform control such that inappropriate correction is not performed by causing correction to be not performed.

Fifth Embodiment

Hereinafter, a fifth embodiment will be described. Parts which are different from the above-described second embodiment will be mainly described, and common parts will not be described.

In the second embodiment, data collection is performed at every fixed time interval while the analysis target program P1 is being executed, and the collection data table 111 is acquired. In the example according to the second embodiment, the entire collection data which is collected in the execution period is registered in the collection data table 111. In contrast, the amount of the RAM 102 which is used by the analysis apparatus 100 may be saved by registering only immediately before and current collection data in the collection data table.

Here, since the hardware example of the analysis apparatus according to the fifth embodiment is the same as the hardware example according to the second embodiment illustrated in FIG. 3, the description thereof will not be repeated. In the fifth embodiment, the same components are indicated using the same reference symbols and names as in the second embodiment. In addition, since an example of a function of an analysis apparatus 100 according to the fifth embodiment is the same as the example of the function according to the second embodiment illustrated in FIG. 5, the description thereof will not be repeated. However, in the fifth embodiment, information which is stored in the collection data storage section 110 is different from that of the second embodiment.

FIG. 23 is a diagram illustrating an example of a collection data table according to the fifth embodiment. A collection data table 111b is stored in the collection data storage section 110 instead of the collection data table 111. The collection data table 111b includes items of a sample number, an analysis target data candidate, an integrated value of count (Si), and a count value (γi) of a counter CT2. Here, since pieces of information, which are registered in the items of the sample number and the analysis target data candidate, are the same as pieces of information which are registered in the same name items of the collection data table 111 illustrated in FIG. 7, the description thereof will not be repeated.

In the item of the integrated value of count (Si), the integrated value (Si) of the section count value of the counter 101b is registered. In the item of the count value (γi) of the counter CT2, the count value (γi) of the counter 101b is registered.

For example, in the collection data table 111b, pieces of information as below are registered. First is information in which the sample number is "N−1", the CPU ID of the analysis target data candidate is "0", the PID is "219", the PC is "0x4110", the integrated value of count (Si) is "140", and the count value (γi) of the counter CT2 is "48683".

The information is collection data which is acquired in a case where (N−1)-th interruption is received from the counter 101a, and indicate that the CPU ID is "0", the process ID is "219", a value of the program counter is "0x4110", the integrated value of count is "140", and the count value of the counter 101b is "48683".

Second is information, in which the sample number is "N", the CPU ID of the analysis target data candidate is "0", the PID is "219", the PC is "0x4230", the integrated value of count (Si) is "1800", and the count value (γi) of the counter CT2 is "50343", in the collection data table 111b.

The information is collection data which is acquired in a case where N-th interruption is received from the counter 101a, and indicate that the CPU ID is "0", the process ID is "219", a value of the program counter is "0x4230", the integrated value of count is "1800", and the count value of the counter 101b is "50343".

Whenever the collection data is acquired, the data collection section 150 overwrites and records the collection data in the collection data table 111b (two times before collection data is overwritten) while leaving the immediately previous collection data. Subsequently, a procedure of a process which is performed by the analysis apparatus 100 according to the fifth embodiment will be described. Here, in the fifth embodiment, the analysis target data is extracted while data collection is performed. In the fifth embodiment, instead of the data collection procedure and the analysis target data extraction procedure in the second embodiment, the following procedure is executed.

Figure 24:
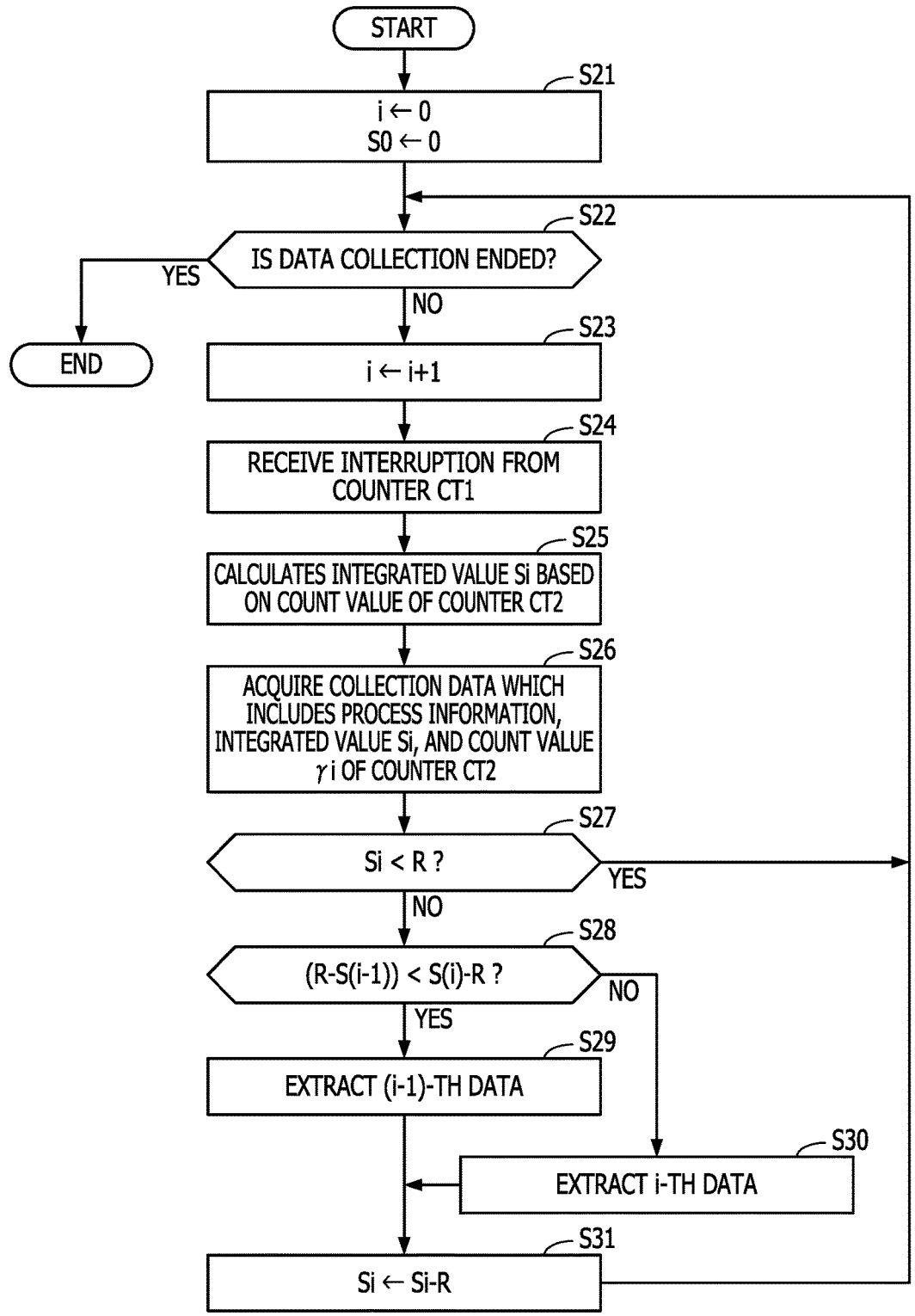
FIG. 24 is a flowchart illustrating an example of analysis target data extraction according to the fifth embodiment.

FIG. 24 is a flowchart illustrating an example of analysis target data extraction according to the fifth embodiment. Hereinafter, the process illustrated in FIG. 24 will be described according to step numbers.

(S21) The analysis target data extraction section 160 substitutes 0 for the variable i. The variable i is a value corresponding to the sample number (there is a case of referring to as a "sample number i"). The analysis target data extraction section 160 substitutes 0 for a variable S0. The variable S0 is an initial value of a variable Si. The variable Si is an integrated value of the section count value of the counter 101b corresponding to the sample number which is displayed by the variable i (there is a case of referring to as an "integrated value Si"). Furthermore, the analysis target data extraction section 160 preserves a current count value γ0 of the counter 101b (counter CT2) in the RAM 102.

(S22) The analysis target data extraction section 160 determines whether or not to end data collection. In a case of ending the data collection, the process is ended. In a case of not ending the data collection, that is, in a case of continuing the data collection, the process proceeds to S23. For example, in a case where the execution of the analysis target program P1 is ended, the data collection is ended.

(S23) The analysis target data extraction section 160 substitutes "i+1" for the variable i. The process may be referred to as a process of incrementing the variable i. Otherwise, the process may be referred to as a process of substituting a result, acquired by adding 1 to the variable i, for the variable i.

(S24) The data collection section 150 receives interruption from the counter 101a (counter CT1).

(S25) The data collection section 150 calculates the integrated value Si based on the count value γi of the counter 101b (counter CT2). Specifically, integrated value Si=S(i−1)+{γi−γ(i−1)}.

(S26) The data collection section 150 acquires the current collection data, which includes the CPU ID, the process ID, the address value of the program counter, the integrated value Si, and the count value γi of the counter 101b (counter CT2), and registers the current collection data in the collection data table 111b. At this time, the data collection section 150 overwrites two times before (sample number "i−2") collection data on the current (sample number "i") collection data.

(S27) The analysis target data extraction section 160 determines whether or not the value, which is substituted for the variable Si, is smaller than the threshold R (Si<R). In a case where the value is smaller than the threshold R, the process proceeds to S22. In a case where the value is not smaller than the threshold R, that is, the value, which is substituted for the variable Si, is equal to or greater than the threshold R (Si≥R), the process proceeds to S28. The threshold R is information which is stored in the RAM 102, the HDD 103, or the like in advance as a value which determines an event-based sampling rate.

(S28) The analysis target data extraction section 160 determines whether or not a result of an arithmetic operation (R−S(i−1)) is smaller than that of an arithmetic operation (S(i)−R), that is, (R−S(i−1))<S(i)−R). In a case where the result of the arithmetic operation (R−S(i−1)) is smaller than that of the arithmetic operation (S(i)−R), the process proceeds to S29. In a case where the result of the arithmetic operation (R−S(i−1)) is not smaller than that of the arithmetic operation (S(i)−R), that is, the result of the arithmetic operation (R−S(i−1)) is equal to or greater than that of the arithmetic operation (S(i)−R), that is, (R−S(i−1)≥S(i)−R), the process proceeds to S30.

(S29) The analysis target data extraction section 160 extracts (i−1)-th (sample number i−1) collection data from the collection data table 111b. The extracted collection data corresponds to the analysis target data. The analysis target data extraction section 160 registers the extracted analysis target data in the analysis target data table 121 which is stored in the analysis target data storage section 120. As illustrated in FIGS. 9A and 9B, in a case where the information of time in which the data is collected is registered in the collection data table 111, the analysis target data extraction section 160 may associate the analysis target data with the time in which the data is collected and register the analysis target data in the analysis target data table 121. Furthermore, the process proceeds to S31.

(S30) The analysis target data extraction section 160 extracts i-th (sample number i) collection data from the collection data table 111b. The extracted collection data corresponds to the analysis target data. The analysis target data extraction section 160 registers the extracted analysis target data in the analysis target data table 121 which is stored in the analysis target data storage section 120. As illustrated in FIGS. 9A and 9B, the point that the analysis target data may be associated with the collecting time and may be registered in the analysis target data table 121 is the same as in S29. Furthermore, the process proceeds to S31.

(S31) The analysis target data extraction section 160 substitutes "variable Si-threshold R" for the variable Si. That is, a value which is acquired by subtracting the threshold R from the integrated value Si until this time is substituted for Si. The analysis target data extraction section 160 updates the integrated value Si of the record of the sample number "N" in the collection data table 111b using a value acquired after subtracting the threshold R. Furthermore, the process proceeds to S22.

In the method according to the fifth embodiment, it is possible to acquire more appropriate operation information as the same as in the second embodiment. In addition, in the collection data table 111b, the amount of information to be recorded is small compared to the collection data table 111. Therefore, compared to a case where the collection data table 111 is used, it is possible to save a storage area such as the RAM 102. In addition, in the fifth embodiment, the analysis apparatus 100 may extract the analysis target data which is acquired by correcting the address value included in the collection data, as the same as the third and fourth embodiments.

Meanwhile, it is possible to realize the information processing according to the first embodiment by causing the arithmetic operation unit 1d to execute a program. In addition, it is possible to realize the information processing according to the second to fifth embodiments by causing the processor 101 to execute a program. It is possible to record the program in the computer-readable recording medium 13.

For example, it is possible to circulate a program by distributing the recording medium 13 in which the program is recorded. In addition, the program may be stored in another computer and may distribute the program via a network. For example, the computer may store (install) the program which is recorded in the recording medium 13 or the program which is received from another computer in the storage device, such as the RAM 102 or the HDD 103, may read the program from the storage device, and may execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus configured to execute a program to generate events, the information processing apparatus comprising:
a counter configured to count a number of events generated when a program is executed by the information processing apparatus, the counter not having a function of outputting an interruption signal;
a memory; and
a processor coupled to the memory and configured to:
acquire, at a regular time interval, an integrated value of count values and first information, the integrated value of count values being acquired by the counter by counting the number of the events, and the first information being operation information that includes identification information of the program at a timing of acquiring the integrated value or information of hardware that is used to execute the program,
store the integrated value and the first information in a first area of the memory,
when the integrated value acquired at a first timing of the regular time interval is lower than a threshold and the integrated value acquired at a second timing which is a next timing of the first timing of the regular time interval is higher than the threshold, determine a first difference between the threshold and the integrated value acquired at the first timing and a second difference between the threshold and the integrated value acquired at the second timing,
select, when the first difference is less than the second difference, the first information acquired at the first timing, and select, when the second difference is less than the first difference, the first information acquired at the second timing, and
store the selected first information in a second area of the memory.

2. The information processing apparatus according to claim 1,
wherein the processor is configured to correct the first information using the integrated value and the threshold.

3. The information processing apparatus according to claim 2,
wherein the processor is configured to correct the first information using a ratio of the first difference to the second difference.

4. The information processing apparatus according to claim 3,
wherein the first information include address values indicated by a program counter, and
wherein the processor is configured to correct the address values using the ratio.

5. The information processing apparatus according to claim 4, wherein the first information include pieces of identification information of processes, which are executed by the program, and the address values indicated by the program counter, and wherein the processor is configured to select whether or not to correct the address values according to comparison of the pieces of identification information of the processes which are included in the first information.

6. The information processing apparatus according to claim 5, wherein the processor is configured to perform correction in a case where the pieces of identification information of the processes included in the first information acquired at the first timing and the first information acquired at the second timing coincide with each other.

7. The information processing apparatus according to claim 1, wherein the processor is configured to subtract value of the threshold from the integrated value when the integrated value exceeds the threshold.

8. The information processing apparatus according to claim 1, further comprising:

a counter to count the number of the events, wherein the counter is a counter which does not have a hardware interruption function, and wherein the processor is configured to receive hardware interruption from another counter at the regular time interval, and acquire the integrated value when the hardware interruption is received.

9. A method executed by an information processing apparatus including a counter and a processor, the counter configured to count a number of events generated when a program is executed by the information processing apparatus, the counter not having a function of outputting an interruption signal, the method comprising:

executing, by a computer, a program to generate events;

acquiring, by the processor at a regular time interval, an integrated value of count values and first information, the integrated value of count values being acquired by the counter by counting the number of the events, and the first information being operation information that includes identification information of the program at a timing of acquiring the integrated value or information of hardware that is used to execute the program;

storing, by the processor, the integrated value and the first information in a first area of a memory;

when the integrated value acquired at a first timing of the regular time interval is lower than a threshold and the integrated value acquired at a second timing which is a next timing of the first timing of the regular time interval is higher than the threshold, determining a first difference between the threshold and the integrated value acquired at the first timing and a second difference between the threshold and the integrated value acquired at the second timing;

selecting, by the processor and when the first difference is less than the second difference the first information acquired at the first timing, and selecting, when the second difference is less than the first difference, the first information acquired at the second timing; and storing, by the processor, the selected first information in a second area of the memory.

10. The method according to claim 9, further comprising:

correcting, by the processor, the first information using the integrated value and the threshold.

11. The method according to claim 10, further comprising:

correcting, by the processor, the first information using a ratio of the first difference to the second difference.

12. The method according to claim 11, wherein the first information includes address values indicated by a program counter, and the method further comprises correcting the address values using the ratio.

13. The method according to claim 12, wherein the first information includes pieces of identification information of processes, which are executed by the program, and the address values indicated by the program counter, and the method further comprises selecting, by the processor, whether or not to correct the address values according to comparison of the pieces of identification information of the processes which are included in the first information.

14. A non-transitory computer readable medium having stored therein a first program that causes a computer to execute a process, the computer including a counter and a processor, the counter configured to count a number of events generated when a second program is executed by the computer, the counter not having a function of outputting an interruption signal, the process comprising:

acquiring, at a regular time interval, an integrated value of count values and first information, the integrated value of count values being acquired by the counter by counting the number of the events, and the first information being operation information that includes identification information of the program at a timing of acquiring the integrated value or information of hardware that is used to execute the program;

storing the integrated value and the first information in a first area of a memory;

when the integrated value acquired at a first timing of the regular time interval is lower than a threshold and the integrated value acquired at a second timing which is a next timing of the first timing of the regular time interval is higher than the threshold, determining a first difference between the threshold and the integrated value acquired at the first timing and a second difference between the threshold and the integrated value acquired at the second timing;

selecting, when the first difference is less than the second difference, the first information acquired at the first timing, and selecting, when the second difference is less than the first difference, the first information acquired at the second timing; and storing, the selected first information in a second area of the memory.

* * * * *